United States Patent [19]
Ikawa et al.

[11] Patent Number: 5,825,151
[45] Date of Patent: Oct. 20, 1998

[54] APPARATUS FOR DRIVING STEPPING MOTOR

[75] Inventors: Yoshihiro Ikawa, Higashiosaka; Teruyuki Takizawa, Neyagawa; Ichiro Kawamura, Osaka, all of Japan

[73] Assignee: Matsushita Electric Industrial Co., Ltd., Kadoma, Japan

[21] Appl. No.: 529,513

[22] Filed: Sep. 18, 1995

[30] Foreign Application Priority Data

Sep. 20, 1994 [JP] Japan ..................................... 6-224371

[51] Int. Cl.[6] ................................................. H02K 29/04
[52] U.S. Cl. ........................... 318/685; 318/671; 364/174
[58] Field of Search .............................. 364/167.01, 174, 364/400; 318/254, 685, 671, 696, 590, 592, 594, 595, 695, 430, 434

[56] References Cited

U.S. PATENT DOCUMENTS

| | | | |
|---|---|---|---|
| 4,446,412 | 5/1984 | Friedman et al. | 318/696 |
| 4,477,756 | 10/1984 | Moriguchi | 318/696 |
| 4,612,588 | 9/1986 | Tsukahara | 360/78 |
| 4,631,657 | 12/1986 | Hil et al. | 318/685 |
| 5,006,773 | 4/1991 | Goldberg | 318/685 |
| 5,231,343 | 7/1993 | Nakamura | 318/696 |
| 5,459,386 | 10/1995 | Okachi et al. | 318/721 |
| 5,504,404 | 4/1996 | Tamaki et al. | 318/432 |
| 5,600,221 | 2/1997 | Tomatsuri et al. | 318/632 |

FOREIGN PATENT DOCUMENTS

| | | |
|---|---|---|
| 60-20798 | 2/1985 | Japan . |
| 6056075 | 12/1985 | Japan . |
| 61-214799 | 9/1986 | Japan . |
| 1171171 | 7/1989 | Japan . |
| 4295300 | 10/1992 | Japan . |
| 5109211 | 4/1993 | Japan . |
| 6343294 | 12/1994 | Japan . |

*Primary Examiner*—John W. Cabeca
*Attorney, Agent, or Firm*—Renner, Otto, Boisselle & Sklar, P.L.L.

[57] ABSTRACT

According to the present invention, a stepping motor driving apparatus having a rotor and a stator in n (an integer equal to or larger than 2) phases for moving a moving body is provided. The stepping motor driving apparatus includes a driver for selectively supplying to the stator a first current pattern for rotating the rotor at a first pitch and a second current pattern for rotating the rotor at a second pitch different from the first pitch based on a drive switching signal. The driver switches the first current pattern and the second current pattern at a point where a torque generated by the first current pattern is equal to a torque generated by the second current pattern and supplies the first current pattern or the second current pattern to the stator.

7 Claims, 36 Drawing Sheets

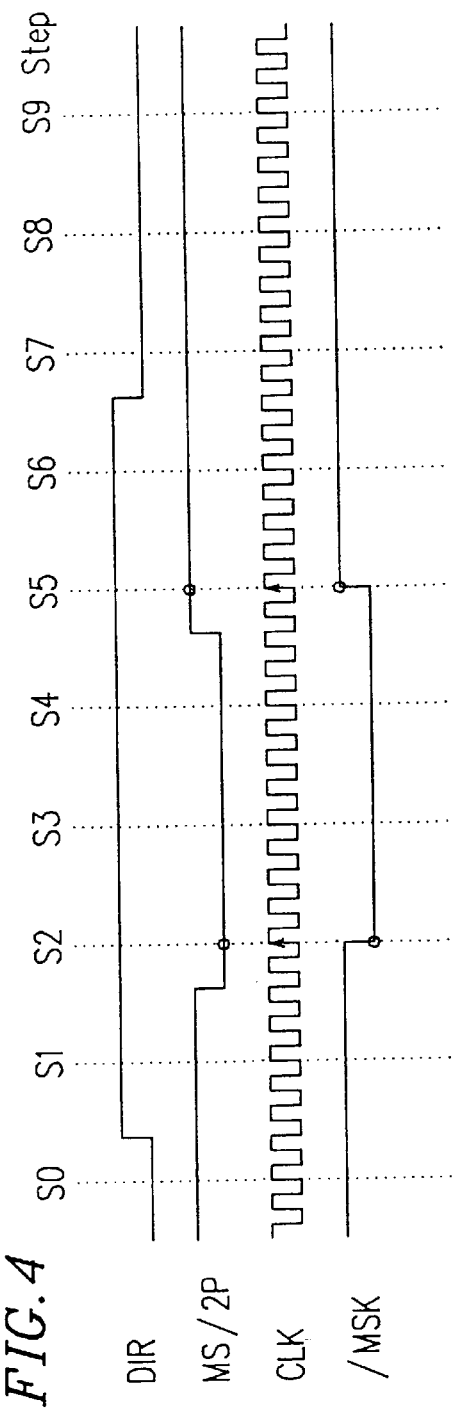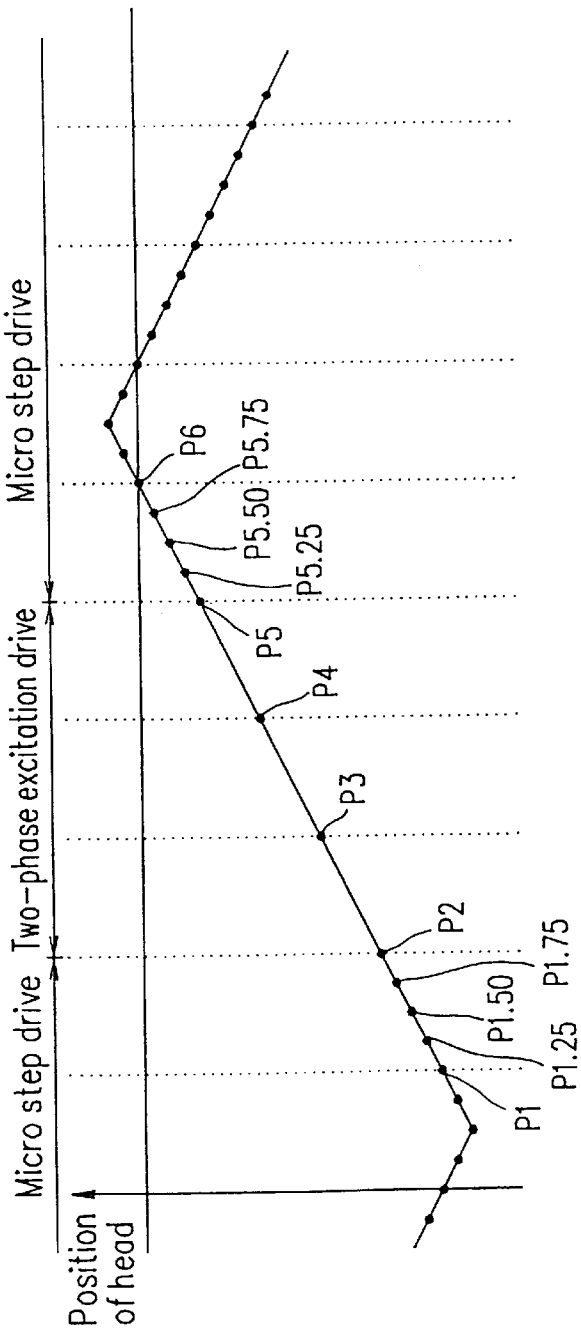
FIG. 4

FIG.25A
| $A_{n+1}$ | $A_n$ | Current instruction value EA | EB | Output of data EA MSB ... LSB | Output of data EB MSB ... LSB |
|---|---|---|---|---|---|
| 0 | 0 | +1 | +1 | 011···11 | 011···11 |
| 0 | 1 | −1 | +1 | 100···01 | 011···11 |
| 1 | 0 | −1 | −1 | 100···01 | 100···01 |
| 1 | 1 | +1 | −1 | 011···11 | 100···01 |
FIG.25B
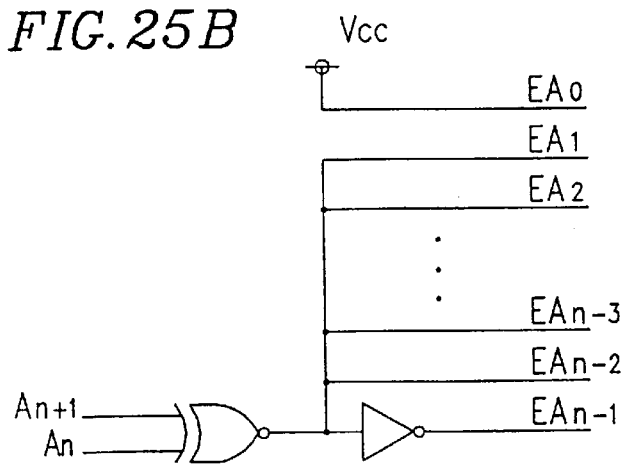
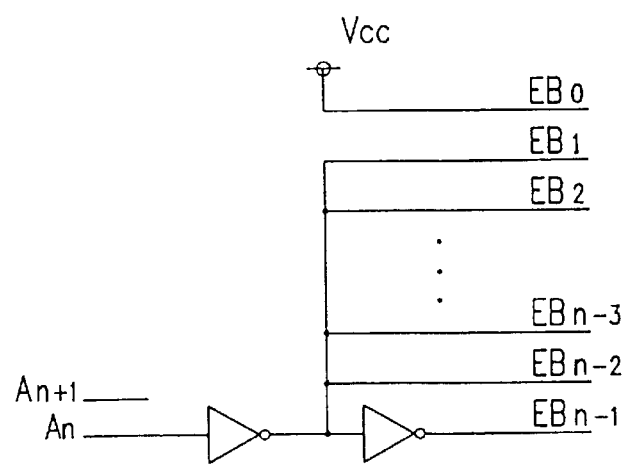

| Direction instruction DIR | Movement correction value | MSB<br>$B_{n+1}$ $B_n$ | $B_2$ $B_1$ $B_0$ |
|---|---|---|---|
| 0 | −3 | 1  1 | 1  0  1 |
| 1 | +3 | 0  0 | 0  1  1 |

Two-phase excitation drive

Micro step drive

APPARATUS FOR DRIVING STEPPING MOTOR

BACKGROUND OF THE INVENTION

1. Field of the Invention

The present invention relates to a stepping motor driving apparatus for moving a moving body using a stepping motor. A "moving body" herein refers to a head for writing/reading information onto/from a disk-shaped recording medium, a printing head for a dot matrix printer, and the like.

2. Description of the Related Art

Hereinafter, a conventional stepping motor driving apparatus will be described with reference to the drawings. In the following description, a conventional stepping motor driving apparatus is used as a head driving apparatus for moving a head of an optical disk driving apparatus.

FIG. 37 is a perspective view schematically showing the configuration of a conventional head driving apparatus. In FIG. 37, a disk-shaped recording medium 1 is a magneto-optic disk, a CD-ROM or the like; a head 2 records/reproduces information onto/from the recording medium 1; a stepping motor 3 is driven by a two-phase excitation only or by a micro step drive only; a moving screw 4 is connected with a driving axis of the stepping motor 3; and a nut piece 5 has teeth to be engaged with a thread groove of the moving screw 4 and is fixed on the head 2.

The driving apparatus having such a configuration converts the rotational movement of the driving axis of the stepping motor 3 into the linear movement of the head 2 (substantially along the radial direction of the recording medium 1). In other words, the stepping motor 3 reciprocates (i.e., moves back and forth) the head 2 substantially in the radial direction of the recording medium 1 by driving the driving axis thereof.

As shown in FIG. 37, a stepping motor driving apparatus 20 drives the stepping motor 3 by a two-phase excitation drive or by a micro step drive. The stepping motor driving apparatus 20 receives a direction instruction DIR instructing the moving direction and a moving pulse CLK as input signals, and outputs driving signals A, /A, B and /B to be applied to two coils as output signals. The driving signals /A and /B herein denote inverted signals in phases of A and B.

FIG. 38A shows excitation sequences (or drive sequences) in a phase A and a phase B when the stepping motor driving apparatus 20 drives the stepping motor 3 by the two-phase excitation drive, while FIG. 38B shows excitation sequences in the phase A and the phase B when the stepping motor driving apparatus 20 drives the stepping motor 3 by the micro step drive.

In FIGS. 38A and 38B, the abscissas indicate the steps of the stepping motor which are normalized by a "unit rotation angle" (degrees) of the stepping motor, while the ordinates indicate the driving current instruction values in the two phases which are normalized by a maximum current flowing in one phase when the stepping motor is driven by the two-phase excitation drive. The unit rotation angle is herein an angle expressed by $(360/(N_{ph} \cdot N_{pol}))$, wherein $N_{ph}$ denotes a number of phases and $N_{pol}$ denotes a number of poles), or a moving angle of the stepping motor in one movement when the motor is driven by the two-phase excitation drive. For example, the unit rotation angle of a two-pole stepping motor having a stator to be excited in the two phases of A, /A, B and /B is 90 degrees, where the phases A and /A are counted as one phase. In FIG. 38B, the steps of the micro step drive are one fourth as large as the steps of the two-phase excitation drive. The driving current shown in FIG. 38B is plotted in a triangular waveform. In the excitation sequences of the micro step drive, the actual drive current is varied in a step shape. In the other graphs showing the excitation sequences in this specification, the abscissas and the ordinates indicate the same as the graph above.

FIGS. 39A and 39B show the stiffness characteristics of the stepping motor (the relationship between the rotational position of the rotor of the stepping motor and the generated torque) when the excitation sequences shown in FIGS. 38A and 38B are implemented, respectively. In FIGS. 39A and 39B, the abscissas indicate the steps normalized by the unit rotation angle while the ordinates indicate the torque normalized by the "maximum torque" generated by supplying a maximum current in the two-phase excitation. In the other graphs showing the stiffness characteristics in this specification, the abscissas and the ordinates indicate the same as the graph above. The states S0 to S4 in FIGS. 39A and 39B correspond to the states S0 to S4 in FIGS. 38A and 38B. In FIGS. 39A and 39B, the points P0 to P4 are the "stable points" of the stepping motor. In the case where the state of the current is not varied, the position of the rotor of the stepping motor is converged to the stable point. In the graphs, the stable point is an intersection point between the curve indicating the stiffness characteristics and the axis of the abscissas, i.e., the point where the torque becomes zero.

The operation of the head driving apparatus having the above configuration will now be described. If the excitation sequences are switched in the order of S0→S1→S2→S3, then the rotor of the stepping motor rotates at the positions P0→P1→P2→P3. On the contrary, if the excitation sequences are switched in an inverse order of S3→S2→S1→S0, then the rotor of the stepping motor rotates at the positions P3→P2→P1→P0 in the reverse direction. By converting the rotation of the stepping motor in the positive and negative directions into the linear movement using a nut piece, the head is moved toward/away from the center of the recording medium (or the disk) in the radial direction of the recording medium.

In the two-phase excitation drive, the current is supplied in the following manner. When the current is normalized, the current is expressed: (phase A, phase B)=(1, 1), (−1, 1), (−1, −1), (1, −1), (1, 1), etc. in this order. A one/two-phase excitation drive is another exemplary driving method and is realized by supplying the current in the following manner: (phase A, phase B)=(1, 1), (0, 1), (−1, 1), (−1, 0), (−1, −1), (0, −1), (1, −1), (1, 0), (1, 1), etc. in this order. The micro step drive is realized by applying a triangular wave where the phases are different from each other by one step (90 degrees in the case of using a two-phase two-pole stepping motor) to the phases A and B. Therefore, the drive method is determined depending upon the waveform of the current flowing in the respective phases. As shown in FIG. 39B, the curves indicating the stiffness characteristics in the micro step drive are denser as compared with the two-phase excitation drive. In other words, the stable points in the micro step drive are disposed more densely as compared with the two-phase excitation drive. Accordingly, by performing the micro step drive, the rotor can be rotated at smaller steps as compared with the two-phase excitation drive (i.e., the resolution is high). On the other hand, the amount of the torque generated by the micro step drive is about one half as small as the amount of the torque generated by the two-phase excitation drive. The one/two-phase excitation drive has intermediate characteristics between those of the two-phase excitation drive and those of the micro step drive with respect to resolution and torque.

Japanese Laid-Open Patent Publications Nos. 1-171171 and 4-295300 disclose a technique for moving a head among the tracks at a high speed and with a high tracking precision by switching the drive method of a stepping motor between the two-phase excitation and the one/two-phase excitation. Japanese Laid-Open Patent Publication No. 61-214799 discloses a technique for improving resolution in moving the head by utilizing the micro step drive. Japanese Laid-Open Patent Publication No. 5-109211 discloses a method for smoothing the generation of the driving torque and reducing the resonance by serially connecting an integrator with a two-phase excitation driver. Japanese Laid-Open Patent Publication No. 58-12592 discloses a technique for driving a moving body by switching the drive method between the two-phase excitation drive and the micro step drive. In this technique, a cogging generated in the two-phase excitation drive is suppressed by applying a negative bias to a transistor for driving the current in the respective phases when the drive method is switched from the two-phase excitation drive to the micro step drive.

However, the conventional driving methods disclosed in the above-identified patent publications have the following problems. First, when the stepping motor is driven by a micro step drive, the moving speed of the head becomes slower as compared with the two-phase excitation drive. As a result, the time required for seeking the tracks becomes longer and the performance of the apparatus is degraded.

On the other hand, when the stepping motor is driven by a two-phase excitation drive method, the seek operation can be performed in a shorter period of time. However, the two-phase excitation drive has a resolution lower than that of the micro step drive, so that the precision in moving the head is degraded.

In addition, in the two-phase excitation drive, the moment the stepping motor is intermittently driven, a large acceleration is applied to the head. As a result, a large disturbance is received by a tracking servo loop, and the tracking stability is degraded. An integral drive method can be employed in order to reduce the large acceleration to be applied to the motor during the intermittent drive. However, the integral drive also has a resolution as low as that of the two-phase excitation, and the precision in moving the head is also unsatisfactory.

In the case of performing the micro step drive, the driving torque thereof is relatively small, so that the head sometimes cannot move as instructed because of the statical friction generated when the moving direction of the head is inverted, and the like.

The technique for switching the drive method of the head between the two-phase excitation drive and the micro step drive can solve the problem relating to the seek time and the moving resolution. However, the application of a negative bias to a transistor for driving the current in the respective phases when the drive method is switched from the two-phase excitation drive to the micro step drive is equivalent to abrupt braking, so that an acceleration is applied to the lens. As a result, a disturbance is applied to the tracking servo loop.

According to the conventional techniques in performing the micro step drive, a current at the same value is supplied to the coil of the stepping motor irrespective of the moving speed of the head. In a conventional head driving apparatus, when the frictional resistance becomes large (or when the moving speed is high), no serious problems occur. However, when the frictional resistance becomes small (or when the moving speed is low), excessive power is likely to generate a so-called cogging, i.e., a reciprocation of the head in the vicinity of the stable point. As a result, the vibration of the lens becomes disadvantageously large.

SUMMARY OF THE INVENTION

According to the present invention, a stepping motor driving apparatus having a rotor and a stator in n (an integer equal to or larger than 2) phases for moving a moving body is provided. The stepping motor driving apparatus includes: a drive means for selectively supplying to the stator a first current pattern for rotating the rotor at a first pitch and a second current pattern for rotating the rotor at a second pitch different from the first pitch based on a drive switching signal. The drive means switches the first current pattern and the second current pattern at a point where an instantaneous current of the first current pattern is equal to an instantaneous current of the second current pattern and supplies the first current pattern or the second current pattern to the stator.

According to another aspect of the present invention, a stepping motor driving apparatus having a rotor and a stator in n (an integer equal to or larger than 2) phases is provided. The stepping motor driving apparatus includes a drive means for selectively supplying to the stator a first current pattern for rotating the rotor at a first pitch, a second current pattern for rotating the rotor at a second pitch different from the first pitch, and a third current pattern for rotating the rotor at a third pitch based on a drive switching signal. The drive means switches the first current pattern and the third current pattern at a point where an instantaneous current of the first current pattern is equal to an instantaneous current of the third current pattern and supplies the first current pattern or the third current pattern to the stator, and switches the first current pattern and the second current pattern at a point where an instantaneous current of the first current pattern is equal to an instantaneous current of the second current pattern and supplies the first current pattern or the second current pattern to the stator.

In one embodiment, the drive means includes: a memory means for storing a first current data indicating the first current pattern and a second current data indicating the second current pattern; and an analog/digital converting means for generating the first current pattern and the second current pattern based on the first current data and the second current data, respectively. The drive means supplies the first current data to the analog/digital converting means by sequentially reading addresses of the memory means, and supplies the second current data to the analog/digital converting means by sequentially reading addresses of the memory means by every m (a natural number) addresses.

In another embodiment, an operation of reading the addresses of the memory means by every m (a natural number) addresses is performed by masking lower bits of the addresses.

In still another embodiment, the instantaneous current of the first current pattern and the instantaneous current of the second current pattern are equal in at least four points. When one of phase currents of the second current pattern is at a constant value, the other phase current of the second current pattern is varied so that a ratio of the respective phase currents of the second current pattern is equal to a ratio of respective phase currents of the first current pattern.

In still another embodiment, one of the phase currents of the second current pattern has a constant value at a 0.5 period, and an absolute value of the constant value is equal to a maximum value of the respective phase currents of the first current pattern.

According to still another aspect of the present invention, a stepping motor driving apparatus having a rotor and a stator in n (an integer equal to or larger than 2) phases for moving a moving body is provided. The stepping motor driving apparatus includes a drive means for selectively supplying to the stator a first current pattern for rotating the rotor at a first pitch and a second current pattern for rotating the rotor at a second pitch different from the first pitch based on a drive switching signal. The drive means includes a phase shift means for equalizing a torque generated by the first current pattern with a torque generated by the second current pattern by shifting either respective phase currents of the first current pattern or respective phase currents of the second current pattern in switching the first current pattern and the second current pattern.

In one embodiment, the drive means includes: a memory means for storing a first current data indicating the first current pattern and a second current data indicating the second current pattern; and an analog/digital converting means for generating the first current pattern and the second current pattern based on the first current data and the second current data, respectively. The phase shift means includes a phase shift calculation means for calculating and outputting a phase shift amount based on a load of the stepping motor and a rotation direction of the rotor. When the drive means reads either one of the first current data and the second current data, the drive means adds an address corresponding to the phase shift amount to the addresses of the memory means where the data to be read is stored.

In another embodiment, the drive means includes an up/down counter for designating the address for reading the first current data and the second current data from the memory means. The up/down counter is an up/down counter having a width of i (an integer equal to or larger than 3) bits, and switches the first current pattern and the second current pattern when all lower (i−2) bits become "0".

In still another embodiment, the phase shift amount does not exceed a predetermined range.

In still another embodiment, the phase shift calculation means calculates the phase shift amount based on a hysteresis characteristic generated when the moving body is driven by the first current pattern and a hysteresis characteristic generated when the moving body is driven by the second current pattern.

In still another embodiment, the drive means includes a current-variable means for equalizing a torque generated by the first current pattern with a torque generated by the second current pattern by multiplying either one of the first current data and the second current data by a constant when the first current pattern and the second current pattern are switched.

In still another embodiment, in moving the moving body at a predetermined speed or lower, either the first current data or the second current data is multiplied by a constant smaller than 1.

Hereinafter, the functions of the stepping motor driving apparatus of the invention will be described.

The drive method can be smoothly switched at a high speed at a point where the difference between the torque generated by the two-phase excitation drive and the torque generated by the micro step drive is small. The resolution can be improved and the disturbance generated by the intermittent drive can be reduced by moving the moving body at fine steps using the micro step drive method. In addition, the moving body can be moved at a high speed using a large torque generated by the two-phase excitation drive.

If the amount of the current flowing through the coils of the stepping motor is increased while maintaining the ratio of the amounts of the current flowing in the respective phases at a constant value, then the positions of the stable point are not varied in the respective phases. In addition, the torque can be partially increased.

Using a current table, including the excitation sequences of the two-phase excitation and the one/two-phase excitation, it is possible to simultaneously take advantage of the two-phase excitation feature in which a large torque can be generated and the micro step drive feature having a high resolution.

By controlling the driving current of the stepping motor in accordance with the amount of the speed instruction of the head, it is possible to compensate for the friction generated in accordance with the head moving speed. In the case of moving the head at a low speed, in particular, the vibration generated by the intermittent drive can be reduced by reducing the excessive power, and utilizing the movement at the fine steps by the micro step drive.

A resonance mode to be determined by a restoration force of the stepping motor from the displacement from the stable points and a mechanical structure of the head, i.e., an electromagnetic resonance mode can be changed by controlling the drive current, thereby smoothly accelerating the head from a low speed to a high speed. When the head is driven at a low speed, the power consumption can be reduced by reducing the driving current.

By varying an electric elasticity, the head can be driven so that the frequency of the moving pulse is not equalized with the resonance frequency determined by the mechanical structure and the electric elasticity. Therefore, it is possible to suppress the adverse effects of the moving body on the tracking servo system.

Thus, the invention described herein makes possible the advantages of (1) providing a stepping motor driving apparatus allowing for the movement of a moving body at a high speed by a two-phase excitation drive; moving the moving body in a high resolution without applying a large disturbance thereto by a micro step drive; and smoothly switching the drive method at a high speed between the two-phase excitation drive and the micro step drive, (2) providing a stepping motor driving apparatus allowing for the reduction of the error in positioning the head during performing the micro step drive by partially increasing the torque without varying the distance among the stable points of the respective steps, (3) providing a stepping motor driving apparatus allowing for the suppression of the generation of the vibration during performing the micro step drive or the two-phase excitation drive by reducing excessive torque generated when the stepping motor is driven at a predetermined speed or lower, and (4) providing a stepping motor driving apparatus allowing for the elimination of the positional error of the moving body in a pausing state and reducing the driving current during performing the micro step drive.

These and other advantages of the present invention will become apparent to those skilled in the art upon reading and understanding the following detailed description with reference to the accompanying figures.

BRIEF DESCRIPTION OF THE DRAWINGS

FIG. 4 shows the timings for switching the drive method.

FIG. 6A is a graph showing the current instruction values for a conventional micro step drive, while

FIG. 7A is a graph showing the stiffness characteristics when the current table shown in FIG. 6A is used, while

FIG. 8A is a graph showing the measurement result of the movement distance of the head shown in FIG. 1 obtainable using the conventional current table shown in FIG. 6A, while

FIG. 9A is a graph showing a current table where the stable points are not disposed at regular intervals and which has not been changed, while

FIG. 11A shows a current table for a micro step drive similar to a conventional current table, while FIG. 11B shows a current table similar to the current table of the first example.

FIG. 22 is a circuit diagram showing an exemplary configuration of a multiplexer 215a.

FIG. 25A is a table showing the relationship between the inputs and the outputs of the two-phase excitation signal generators 214a and 214b, while FIG. 25B is a circuit diagram showing an exemplary configuration of the two-phase excitation signal generators 214a and 214b for implementing the relationship shown in FIG. 25A.

FIG. 26A is a table showing the relationship between the inputs and the outputs of a movement correction value generator 211, while

FIG. 32A is a graph showing the stiffness characteristics when the current is not limited, while

FIG. 38A shows excitation sequences in an A-phase and a B-phase when the stepping motor driving apparatus drives the stepping motor by the two-phase excitation drive, while

DESCRIPTION OF THE PREFERRED EMBODIMENTS

Figure 1:
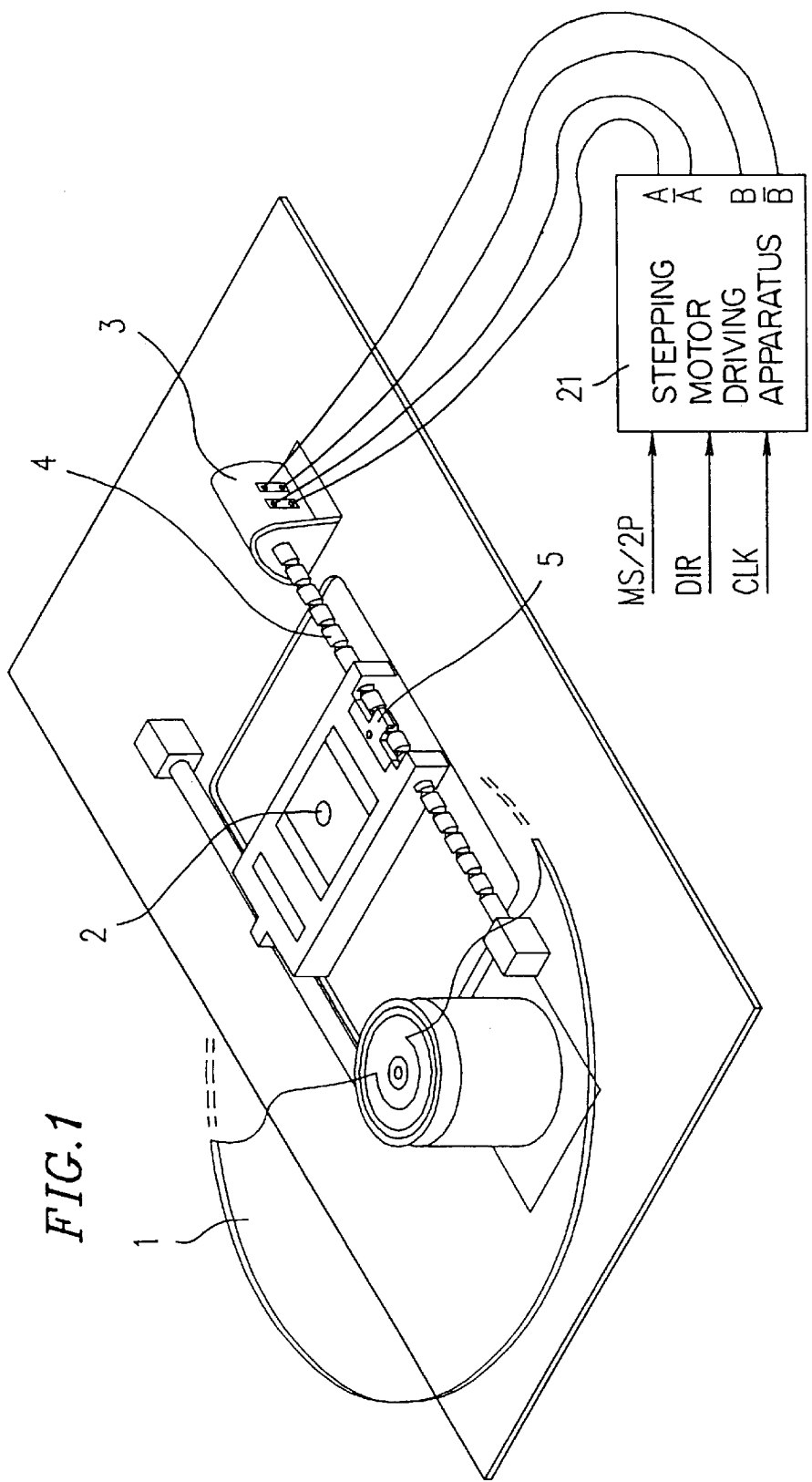
FIG. 1 is a perspective view schematically showing a configuration of a head driving apparatus according to a first example of the present invention.

Hereinafter, the stepping motor driving apparatus according to the present invention will be described by way of illustrative examples with reference to the accompanying drawings. In the following first to seventh examples, the stepping motor driving apparatus according to the present invention is applied to a head driving apparatus for an optical disk driving apparatus, and a moving body to be driven by the stepping motor is a head. It is noted that the same reference numerals represent the same components throughout the following examples.

EXAMPLE 1

FIG. 1 is a perspective view schematically showing a configuration of a head driving apparatus according to a first example of the present invention. In FIG. 1, an optical disk 1 is a disk-shaped recording medium such as a phase-change type optical disk, a CD-ROM or the like; a head 2 records/reproduces information onto/from the recording medium 1; a stepping motor 3 drives the head 2; a moving screw 4 is connected with a driving axis of the stepping motor 3; and a nut piece 5 is engaged with a thread groove of the moving screw 4 and is fixed on the head 2. The rotation movement of the driving axis of the stepping motor 3 is converted into the linear movement of the head 2 (substantially along the radial direction of the recording medium 1). In other words, the stepping motor 3 reciprocates the head 2 substantially in the radial direction of the recording medium 1 by driving the driving axis of the motor.

The stepping motor driving apparatus 21 drives the stepping motor 3 by a two-phase excitation drive or by a micro step drive. More specifically, the drive method is switched between the two-phase excitation drive and the micro step drive based on a speed instruction output from an external servo circuit (not shown) or the like. In performing the seek operation during which the head is moving at a high speed, the two-phase excitation drive is performed, while in the recording and reproducing operations during which the head is moving at a low speed, the micro step drive is performed. In the transition from the recording/reproducing mode at a low speed to the seek mode at a high speed, the speed instruction value gradually increases so as to be a constant value. In this case, if the speed instruction value is smaller than a threshold value, the micro step drive is performed. On the other hand, if the speed instruction value is larger than the threshold value, the two-phase excitation drive is performed. In the same way, in the transition from the seek mode to the recording/reproducing mode, if the speed instruction value is larger than a threshold value, the two-phase excitation drive is performed, and if the speed instruction value is smaller than the threshold value, the micro step drive is performed. That is to say, by switching the modes, the speed instruction value is varied substantially in a trapezoidal shape. The micro step drive is performed in the region where the speed instruction value is at a low level and the two-phase excitation drive is performed in the region where the speed instruction value is at a high level.

Figure 2:
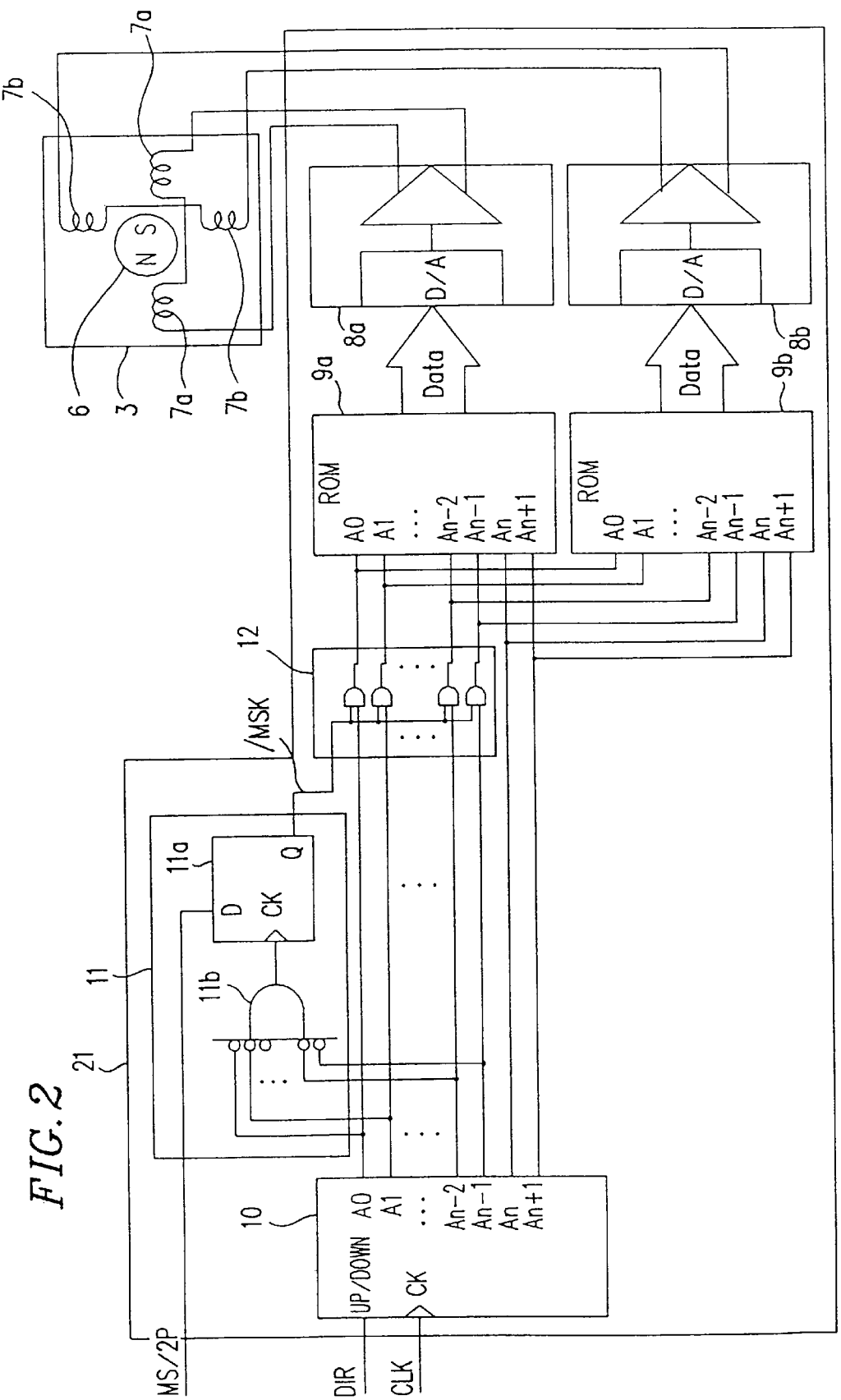
FIG. 2 is a block diagram showing a configuration of a stepping motor driving apparatus according to the present invention.

FIG. 2 is a block diagram showing a configuration of a stepping motor driving apparatus 21 for the head driving apparatus shown in FIG. 1. The stepping motor 3 includes a rotor 6 made of a permanent magnet and a stator consisting of two coils 7a (a coil for the A-phase) and 7b (a coil for the B-phase). In the following description, the subscripts a and b indicate that the components denoted by the subscripts are associated with the phases A and B of the stepping motor. Current drivers 8a and 8b supply a current to the two coils 7a and 7b, respectively, based on the digital data indicating the current instruction value, thereby driving the stepping motor 3. Each of the current drivers 8a and 8b includes a D/A converter for receiving the digital data and converting the digital data into an analog signal, and an amplifier for amplifying and outputting the analog signal from the D/A converter. This amplifier can be implemented by an amplifying device such as a transistor. The digital data (or the current instruction value) is supplied to the current drivers 8a and 8b by read-only memories (ROMs) 9a and 9b, respectively.

Figure 3:
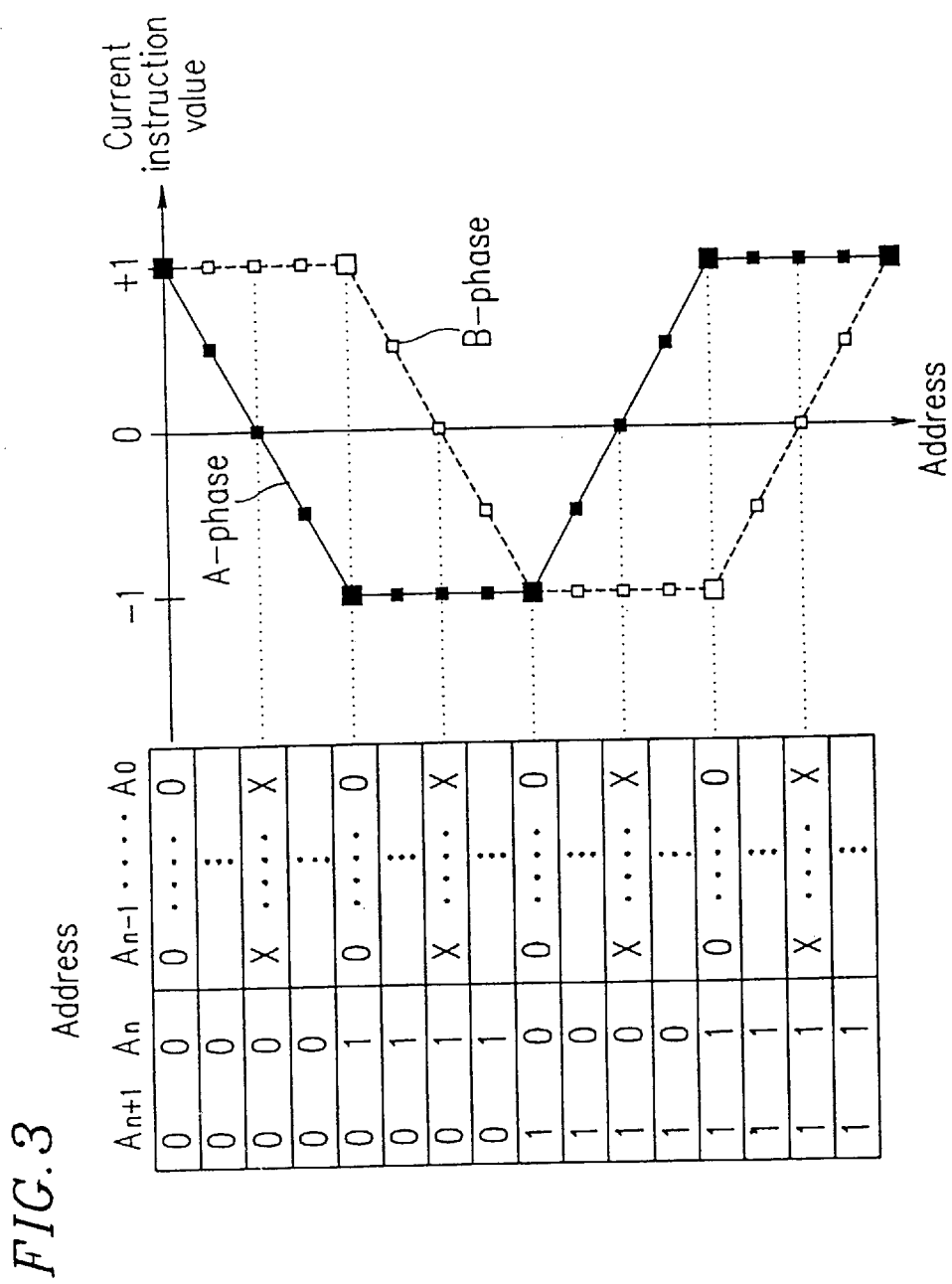
FIG. 3 shows the addresses of ROMs 9a and 9b and a graph showing the current instruction values represented by the digital data stored at the respective addresses.

FIG. 3 shows the addresses of the ROMs 9a and 9b and a graph showing the current instruction values which are represented by the digital data and stored at the respective addresses. In the graph representing the current instruction values shown on the right side of FIG. 3, the solid line indicates the current instruction values for the A-phase stored in the ROM 9a, and the broken line indicates the current instruction values for the B-phase stored in the ROM 9b. These data representing the current instruction values are stored at the corresponding addresses shown on the left side of FIG. 3.

As shown in FIG. 3, the data representing the four current instruction values for the two-phase excitation drive are stored at the addresses where all the lower bits An−1 to A0 of the address input of the ROMs 9a and 9b are "0". The current instruction value for the micro step drive is composed of the four current instruction values for the two-phase excitation drive and a current instruction value obtained by interpolating the four current instruction values with an appropriate monotonically increasing (or decreasing) function. The width of the steps in the micro step drive is N (an integer; hereinafter, this integer will be called a "division number") times as small as the width of the steps in the two-phase excitation drive. In the first example, the division number is an n-th power of 2. Since n is two, the resulting division number is four. Since the unit rotation angle of the stepping motor (a unit step in the two-phase excitation drive) is 90 degrees, the step in the micro step drive is: 90/4=22.5 degrees. As a result, the current instruction value for the micro step drive becomes equal to the current instruction value for the two-phase excitation drive in every four values.

An up/down counter 10 receives a direction instruction DIR indicating the moving direction of the head at an up/down input terminal UP/DOWN, and receives a moving pulse CLK of the head at a clock input terminal CK, thereby outputting address signals An+1 to A0 having a width of (n+2) bits. In the case where the direction instruction DIR is "1", the up/down counter 10 performs an increment operation for the addresses one by one in the leading edge of the moving pulse CLK. On the other hand, in the case where the direction instruction DIR is "0", the up/down counter 10 performs a decrement operation for the addresses one by one in the leading edge of the moving pulse CLK. The up/down counter 10 cyclicly outputs the addresses. That is to say, if the increment operation is performed in the state where "111 . . . 1" is output as an address signal, then "000 . . . 0" is output next. On the contrary, if the decrement operation is performed in the state where "000 . . . 0" is output as an address signal, then "111 . . . 1" is output next.

A switching timing adjuster 11 generates a mask instruction /MSK. More specifically, in the case where all the lower bits An−1 to A0 of the address output of the up/down counter 10 are "0", the output of an AND gate 11b becomes "1". By latching a switching instruction MS/2P for switching the drive method between the two-phase excitation drive and the micro step drive with the output of the AND gate 11b by a D flip-flop 11a, the mask instruction /MSK can be obtained. The switching instruction MS/2P of "1" denotes the micro step drive. On the other hand, the switching instruction MS/2P of "0" denotes the two-phase excitation drive. A masker 12 selectively masks the lower bits An−1 to A0 of the output of the up/down counter 10 based on the mask instruction /MSK. More specifically, when the mask instruction /MSK is "1", the masking is not performed (or the mask is removed). On the other hand, when the mask instruction /MSK is "0", the masking is performed. After the masking is performed or after the mask is removed, the address signals An+1 to A0 output from the up/down counter 10 are input to the address input terminals An+1 to A0 of the ROMs 9a and 9b.

Figure 5:
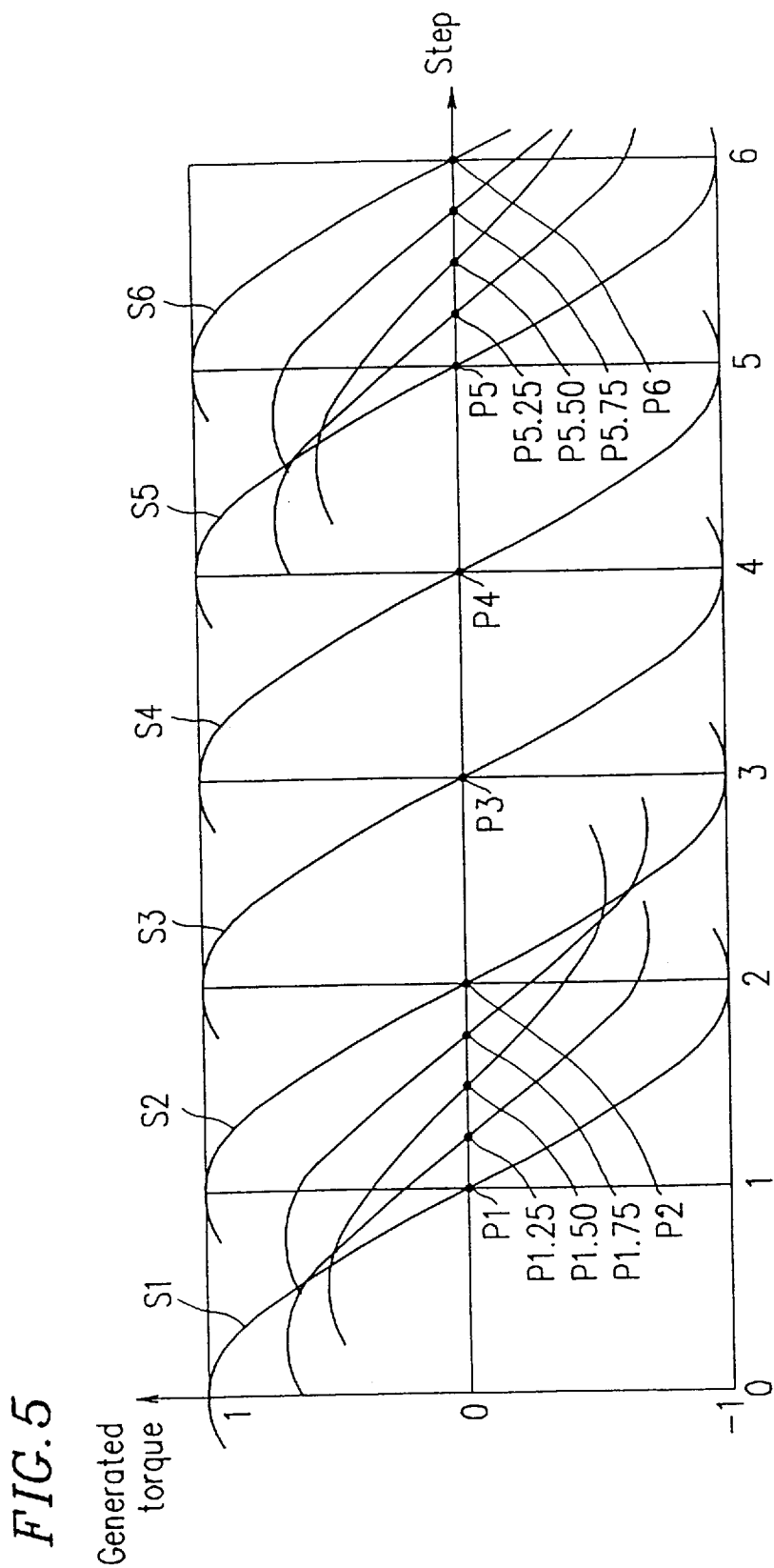
FIG. 5 is a graph showing the stiffness characteristics of the principal portions corresponding to the switching timings shown in FIG. 4.

Referring to FIGS. 1 to 5, the operation of the head driving apparatus having the above configuration will be described. FIG. 4 shows the timings for switching the drive method. In FIGS. 4 and 5, the abscissas indicate the rotation positions of the rotor of the stepping motor by using the steps normalized by the unit rotation angle (90 degrees, in this example) in the two-phase excitation drive. The waveforms shown in FIG. 4 indicate the waveforms of the direction instruction DIR, the switching instruction MS/2P, the moving pulse CLK, the mask instruction /MSK and the positions of the head from top to bottom. FIG. 5 shows the stiffness characteristics of the principal portions corresponding to the switching timings shown in FIG. 4. In FIG. 5, the ordinates indicate a torque normalized by a maximum torque generated in the two-phase excitation drive, and the division number is four (n=2). The excitation states S1 to S6 in FIG. 4 correspond to S1 to S6 of the stiffness characteristics shown in FIG. 5. In FIGS. 4 and 5, P1 to P6 are "stable points" where the rotation position of the rotor 6 is converged or the rotor pauses when the state of the current flowing through the coils 7a and 7b is not varied.

By sequentially switching the excitation states in the order of S1→S2→S3, and the like, the rotor 6 rotates at the positions P1→P2→P3→, and the like. The rotation movement of the rotor 6 of the stepping motor 3 is converted into linear movement for the head 2 by the moving screw 4 and the nut piece 5. As a result, the head 2 is moved towards or away from the center of the recording medium 1 along the radial direction thereof.

The switching signal will now be described in the sequential order of the excitation states S1 to S8. In the initial excitation state S1, the head is driven in the direction defined by the direction instruction DIR by the micro step drive. Since the division number is four, the rotor 6 rotates every step in the two-phase excitation drive and every 0.25 step in the micro step drive. That is to say, a fine transition is performed from the state S1 to the state S2 in the order of P1→P1.25→P1.50→P1.75→P2. In order to switch the drive method from the micro step drive into the two-phase excitation drive on the way of the transition from the state S1 to the state S2, the switching instruction MS/2P is changed from "1" into "0".

Next, the state where all the lower bits An−1 to A0 at the output of the up/down counter 10 become "0", i.e., the state S2 will be analyzed. In this case, the switching instruction MS/2P input to the D input of the D flip-flop 11a of the switching timing adjuster 11 is latched by the output of the AND gate 11b so as to be output to the masker 12 as the mask instruction /MSK. The lower bits An−1 to A0 at the output of the up/down counter 10 remain unmasked from the state S1 to the point immediately before the state S2. However, the moment the transition to the state S2 is completed, the lower bits An−1 to A0 are masked by the masker 12. When the lower bits An−1 to A0 at the output of the up/down counter 10 are masked, the ROMs 9a and 9b output the current instruction values stored at the addresses where all the lower bits are "0", i.e., the current instruction values for the two-phase excitation drive to the current drivers 8a and 8b.

If the moving pulse CLK continues to be input to the up/down counter 10, the upper bits An and An+1 at the output of the up/down counter 10 are sequentially varied, so that the current instruction values for the two-phase excitation drive in the current tables stored in the ROMs 9a and 9b are sequentially output. As shown in FIG. 4, in the states S2 to S4 where the mask instruction is valid, the two-phase excitation drive is performed. The rotor 6 rotates at the stable points of the stiffness characteristics shown in FIG. 5 corresponding to the respective excitation states S2 to S4 in the sequential order of P2→P3→P4→P5. As a result, the stepping motor 3 rotates by the two-phase excitation drive. As shown in the stiffness characteristics in FIG. 5, the torque generated in the two-phase excitation drive is larger than the torque generated in the micro step drive. Consequently, the head 2 can be moved at a high speed.

At a point between the states S4 and S5, the switching instruction MS/2P is changed from "0" indicating the two-phase excitation drive into "1" indicating the micro step drive. When all the lower bits An−1 to A0 at the output of the up/down counter 10 become "0", i.e., when the state S5 begins, the D flip-flop 11a latches the switching instruction MS/2P with the output of the AND gate 11b, and outputs the latched instruction to the masker 12 as a mask instruction /MSK. As a result, the masker 12 unmasks the lower bits in the state S5, and the rotor 6 rotates in the order of P5→P5.25→P5.50→P5.75→P6 by every 0.25 step from the state S5 to the state S6.

The increment and the decrement of the up/down counter 10 are determined by the direction instruction DIR. When the direction instruction DIR is changed from "1" into "0" at a point between the states S6 and S7, the decrement operation is performed with respect to the address output from the up/down counter 10 and the head 2 starts to move in the reverse direction. The switching operation between the micro step drive and the two-phase excitation drive when the direction instruction DIR is "0" is performed in the same way as the above-described operation except that the direction is reversed.

In the first example, the data indicating the current instruction values for the micro step drive in the respective steps are sequentially stored at the addresses of the ROMs 9a and 9b. On the other hand, the data indicating the current instruction values for the two-phase excitation drive in the respective steps are sequentially stored in the ROMs 9a and 9b at every N-th power of two addresses of the addresses at which the data for the micro step drive are stored. By masking the lower bits at the output of the up/down counter 10, the two-phase excitation drive can be performed, while by unmasking the lower bits, the micro step drive can be performed. As a result, the head can be moved at a high speed during the seek operation, while the head can be precisely moved at fine steps without applying a large disturbance during the recording/reproducing operations. In addition, the drive method can be switched between the two-phase excitation drive and the micro step drive only by controlling the mask of the lower addresses at the output of the up/down counter 10. As a result, the drive method can be switched smoothly and at a high speed.

EXAMPLE 2

A head driving apparatus of a second example of the present invention has the same configuration as that of the head driving apparatus of the first example except for a current table (a table which describes the data indicating the current instruction values) in a ROM. Hereinafter, the procedure of forming the current table of this example will now be described with reference to FIGS. 6A and 6B.

Figure 6A:
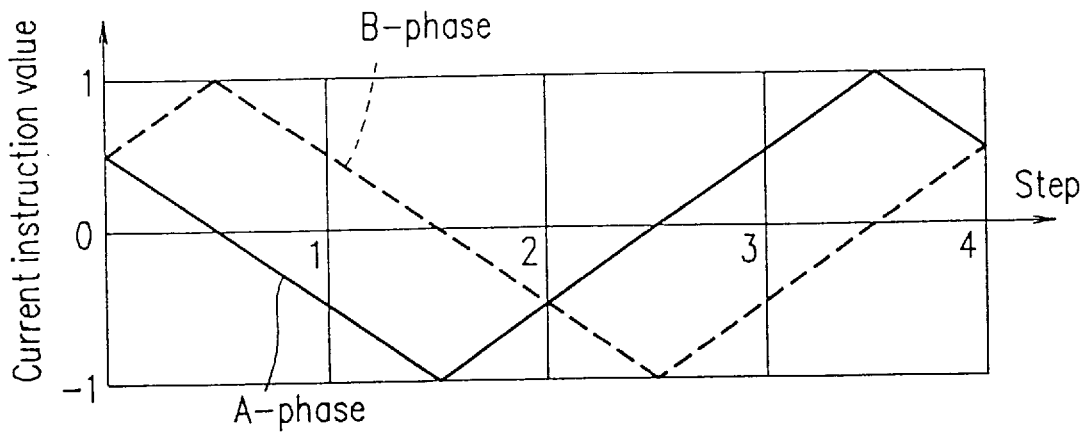

FIG. 6A is a graph showing the current instruction values for a conventional micro step drive. Though the current instruction values are varied in triangular waves in FIG. 6A, the values may be varied in a periodic function such as a sine wave. This periodic function is calculated based on the characteristics of the magnetic circuit of the stepping motor 3. The periodic function used for the micro step drive has a uniform stiffness characteristic. In other words, the peaks of the waveforms representing the stiffness characteristics are at an equal level, and the stable points are located at regular intervals.

An objective of the second example is partially improving the torque by changing the current table without changing the interval between the stable points in the case of using a conventional current table.

Figure 6B:
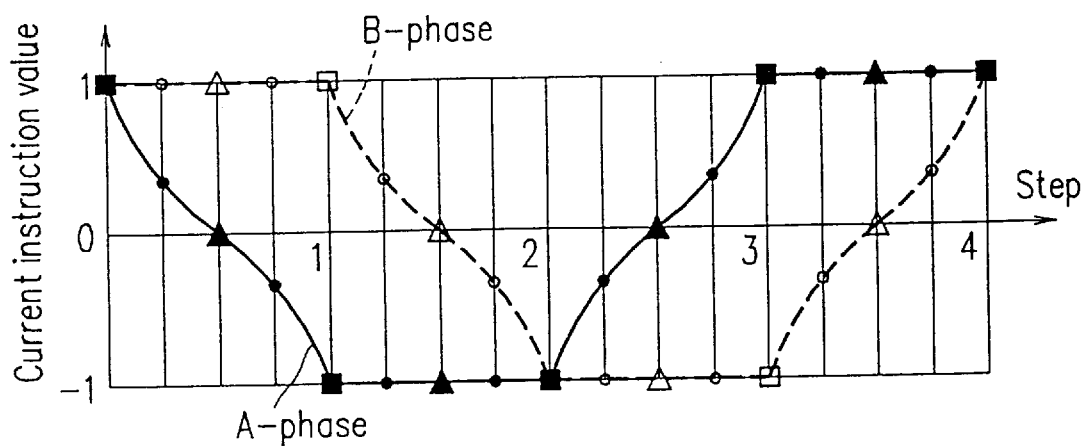
FIG. 6B is a graph showing the current instruction values for a micro step drive of the first example.

FIG. 6B is a graph showing the current instruction values for the micro step drive of this example. The current table of FIG. 6B is formed by using a current table for a conventional micro step drive in the following manner.

The currents flowing through the coils 7a and 7b are assumed to be denoted by IA and IB. By comparing the absolute values of IA and IB, the following operations are performed.

(i) When |IA|>|IB|,
 IB:=sign (IB)·(|IB/IA|)
 IA:=sign (IA)
(ii) When |IA|<|IB|,
 IA:=sign (IA)·(|IA/IB|)
 IB:=sign (IB)

The currents IA and IB are normalized so that "1" represents the maximum positive current and that "−1" represents the maximum negative current. The operator ":=" represents an operation of substituting the value expressed by the right side for the variable of the left side. The function "sign ( )" is a so-called sign function. That is to say, when the argument is a positive number, the function gives "1"; when the argument is a negative number, the function gives "−1"; and when the argument is zero, the function gives "0".

Figure 7A:
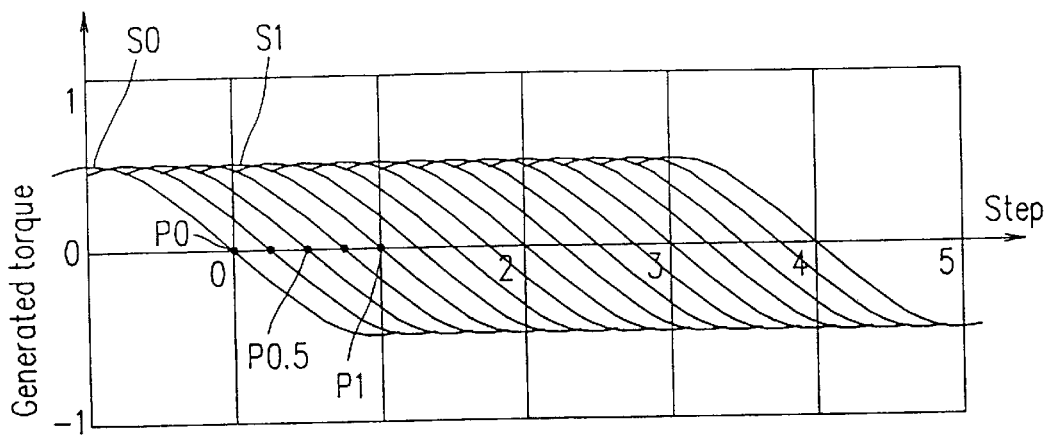

The currents IA and IB, obtained by conducting the above operation, become a current table for supplying a maximum amount of current to at least one of the two coils 7a and 7b while maintaining the ratio of the currents flowing through the coils 7a and 7b equal to the ratios of the currents of coils 7a and 7b based on the conventional current table. The operation of the stepping motor using the current table formed in the above-described manner will be described with reference to FIGS. 6A and 6B and FIGS. 7A and 7B. FIG. 7A (conventional example) shows the stiffness characteristics when the current table shown in FIG. 6A (conventional example) is used, while FIG. 7B (second example) shows the stiffness characteristics when the current table shown in FIG. 6B (second example) is used.

Figure 7B:
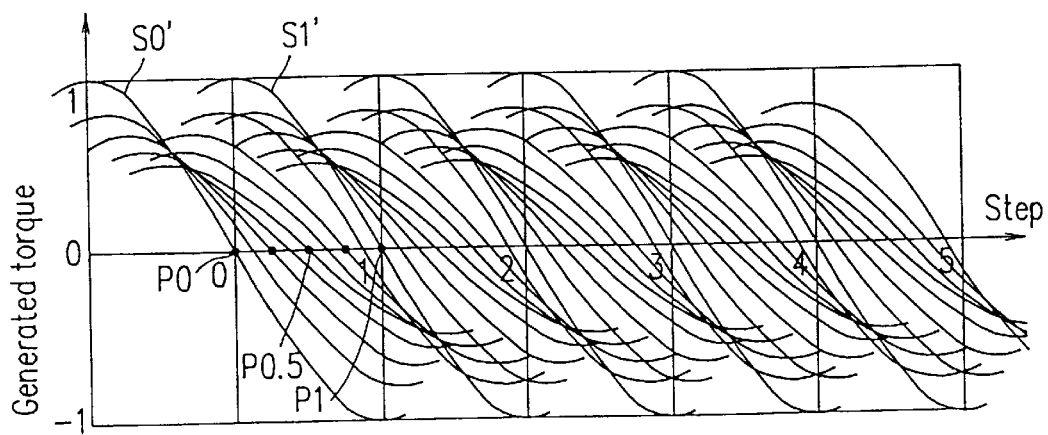
FIG. 7B is a graph showing the stiffness characteristics when the current table shown in FIG. 6B is used.

In the two cases shown in FIGS. 6A and 6B, the ratio of the two currents flowing through the coils 7a and 7b is the same. Accordingly, the stable points P0 and P1, where the rotor 6 pauses, hardly changes in FIGS. 7A and 7B. In the second example, a current having a maximum absolute value flows through at least one of the two coils. Therefore, the stiffness characteristics indicated by the curves S0' and S1' in FIG. 7B are different from those indicated by the curves S0 and S1 in FIG. 7A. For example, the amount of torque generated in the vicinity of the stable points P0 and P1 shown in FIG. 7B (second example) is substantially double the amount of, because the inclinations of the curves S0' and S1' at the stable points P0 and P1 shown in FIG. 7B are twice of the inclinations of the curves S0 and S1 shown in FIG. 7A. In other words, the torque is partially improved with the stiffness characteristics.

When the normalized values of the A-phase current and the B-phase current are represented by (A, B), the curve indicating the current instruction values passes through the following points as shown in FIG. 6B: (A, B)=(1, 1), (0, 1), (−1, 1), (−1, 0), (−1, −1), (0, −1), (1, −1), (1, 0), (1, 1), etc. in this order. By using these current instruction values, the stepping motor is driven by the two-phase excitation or a one/two-phase excitation. That is to say, the current table formed in the above-described manner is a current table for a micro step drive including the current instruction values for the two-phase excitation and the one/two-phase excitation.

As described above, in the second example, a maximum amount of current is supplied to at least one of the two coils 7a and 7b of the stepping motor 3 while maintaining the ratio of the currents flowing through the coils 7a and 7b equal to the ratio of the two currents by the conventional current table. As a result, the generated torque can be partially increased without changing the stable points where the rotor of the stepping motor 3 pauses, or while maintaining the stable points located at regular intervals. In the same way as in the first example, the drive method can be switched smoothly and at a high speed between the two-phase excitation drive and the micro step drive.

The current table formed by the above-described method includes the current instruction values for the two-phase excitation and the one/two-phase excitation. Therefore, the drive method can be selected based on the speed for driving the stepping motor: the two-phase excitation (using the current values denoted by ■ and □) is selected for driving the stepping motor at a high speed; the one/two-phase excitation (using the current values denoted by ■, □, ▲ and ∆) is selected for driving the stepping motor at a medium speed; and the micro step drive (using all the current values) is selected for driving the stepping motor at a low speed. Accordingly, the stepping motor driving apparatus of the second example can simultaneously take advantage of the two-phase excitation drive feature where a large torque can be generated and the one/two-phase excitation drive feature and the micro step drive feature with improved resolution.

Figure 8A:
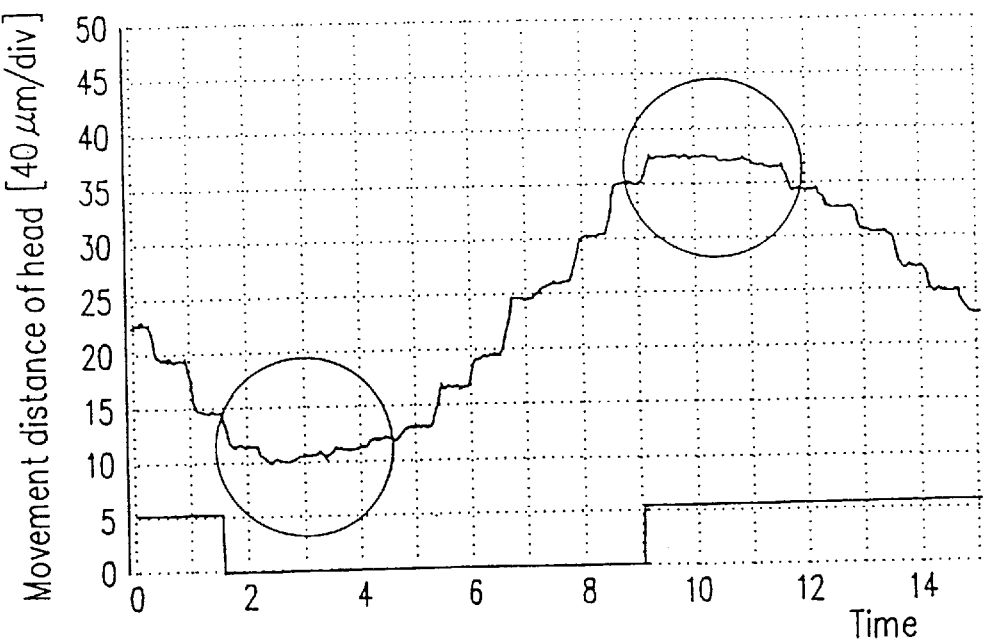
Figure 8B:
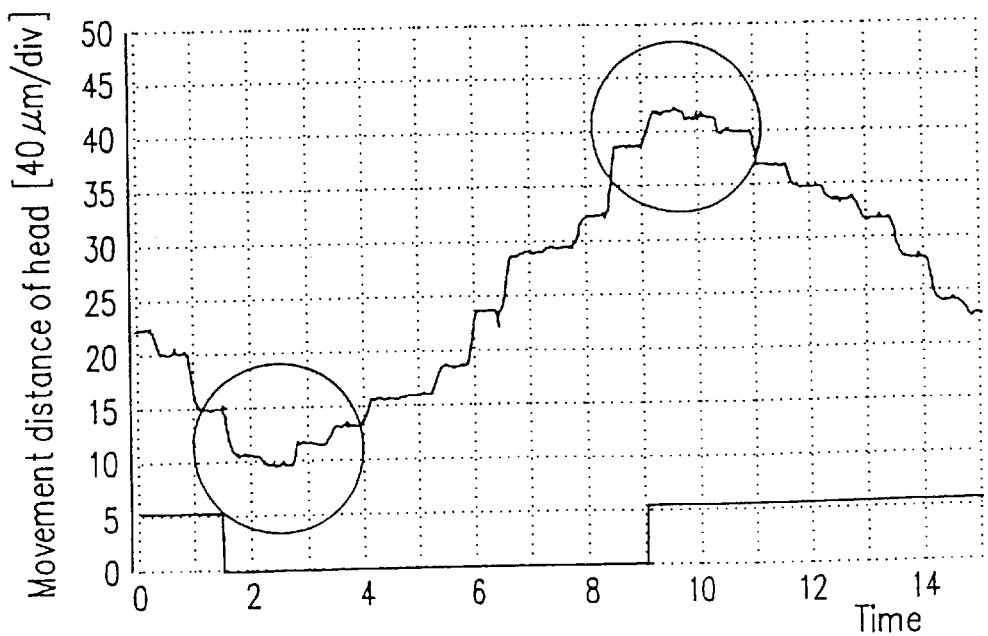
FIG. 8B shows the measurement result of the movement distance of the head shown in FIG. 1 obtainable using the current table of the second example shown in FIG. 6B.

FIG. 8A shows the measurement result of the movement distance of the head shown in FIG. 1 obtainable using the conventional current table shown in FIG. 6A, while FIG. 8B shows the measurement result of the movement distance of the head shown in FIG. 1 obtainable using the current table of the second example shown in FIG. 6B. In FIGS. 8A and 8B, the abscissas indicate time and the ordinates indicate a movement distance of the head. The square wave shown in the lower part of each of FIGS. 8A and 8B plots the direction instruction. Since the division number is four, the stepping motor is driven by every 0.25 step in both cases. In both cases shown in FIGS. 8A and 8B, the resolution in positioning the head is one fourth as low as that obtained by the two-phase excitation drive.

In FIG. 8A, a phenomenon, that the head cannot move because of the statical friction when the moving direction of the head is inverted, occurs as indicated by the circles. On the other hand, in FIG. 8B, the head can move according to the instruction as indicated by the circles, because the torque generated is improved in the second example. The other effects to be attained by the method of the second example are the same as those of the first example.

Various kinds of current tables can be used for the micro step drive, depending upon the structure and the operation of the stepping motor. For example, in driving a stepping motor where the positions of the stator are not located at regular intervals in phases A and B, the stable points of the current table can be moved beforehand in accordance with the deviation of the stator. In addition, in order to smoothly decelerate the speed of the motor without changing the moving pulse CLK when the head comes close to the inner or outer periphery of the recording medium, the current table, where the stable points are located at different intervals, can be substituted for the current table where the stable points are located at regular intervals.

A current table for a conventional micro step drive where the stable points are located at regular intervals has been described. In the second example, by changing the current table, the torque can be partially improved without changing the positions of the stable points.

Figure 9A:
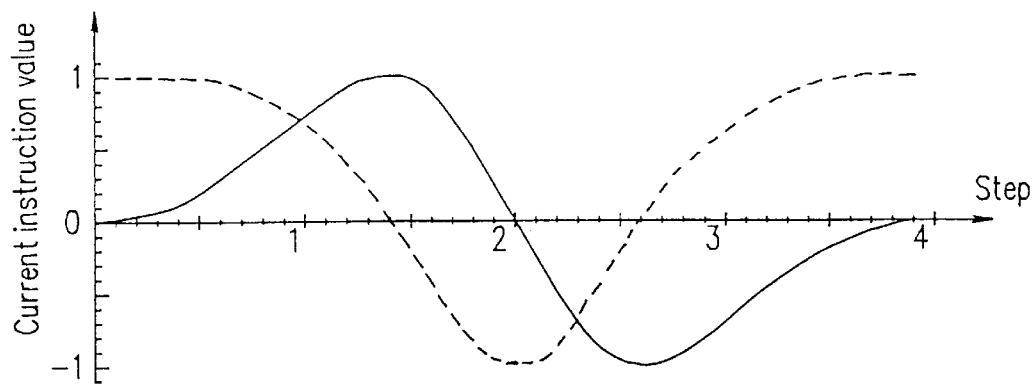
Figure 9B:
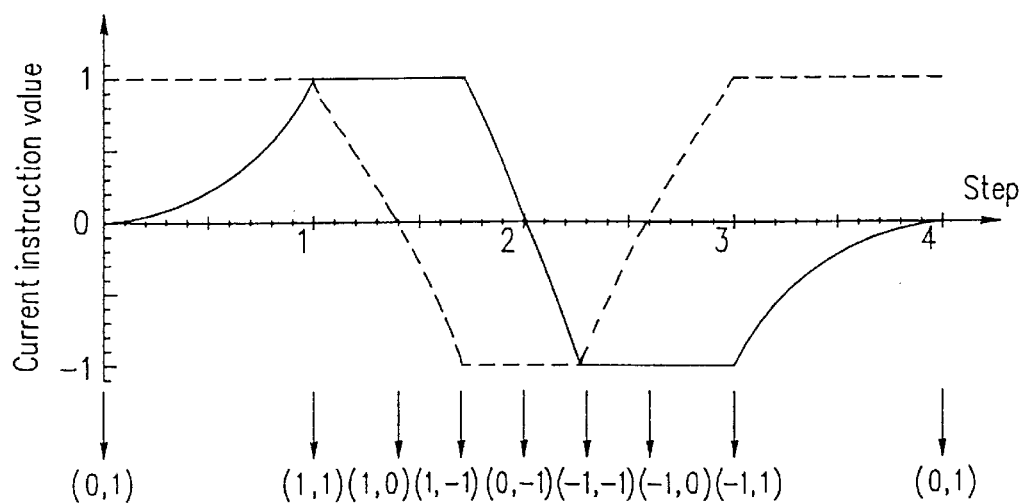
FIG. 9B is a graph showing a current table obtained by changing the current table shown in FIG. 9A by the method of the second example.

Furthermore, even when the stable points are not disposed at regular intervals as in the variants shown in FIGS. 9A and 9B, the positions of the stable points are not changed and the torque is partially improved by using the current table formed in the above-described procedure. Therefore, according to the method of the second example, it is not always necessary to dispose the stable points at regular intervals. According to the method of the second example, the torque can be partially improved by modifying a current table where the stable points are not disposed at regular intervals, without changing the ratio of the currents in the two phases in a given current table suitable for accomplishing an objective and changing the interval among the stable points. FIG. 9A is a graph showing a current table where the stable points are not disposed at regular intervals and which has not been changed, while FIG. 9B is a graph showing a current table substituted for the current table shown in FIG. 9A by the method of the second example.

EXAMPLE 3

A head driving apparatus using a stepping motor according to a third example of the present invention is the same as the head driving apparatus of the first example except for the stepping motor driving apparatus.

Figure 10:
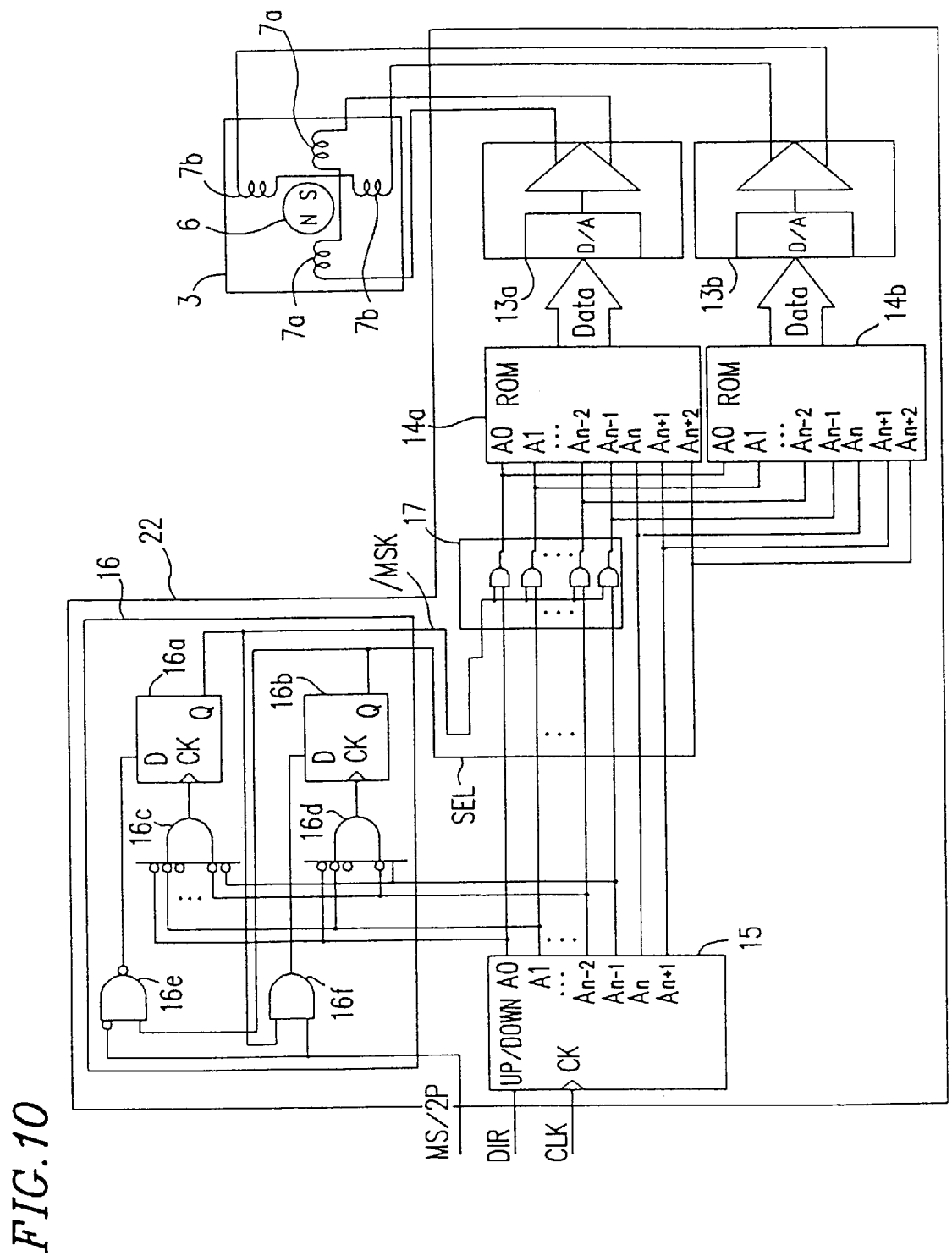
FIG. 10 is a block diagram showing a configuration of a stepping motor driving apparatus according to a third example of the present invention.

FIG. 10 is a block diagram showing a configuration of a stepping motor driving apparatus 22 of the third example. The stepping motor 3 includes a rotor 6 made of a permanent magnet and a stator consisting of two coils 7a and 7b. Current drivers 13a and 13b supply a current to the two coils 7a and 7b based on the digital data indicating the current instruction values, thereby driving the stepping motor 3. Each of the current drivers 13a and 13b includes a D/A converter for receiving the digital data and converting the digital data into an analog signal, and an amplifier for amplifying and outputting the analog signal from the D/A converter. This amplifier can be implemented by an amplifying device such as a transistor. The digital data (or the current instruction values) is supplied to the current drivers 13a and 13b by read-only memories (ROMs) 14a and 14b, respectively.

Figures 11A, 11B:
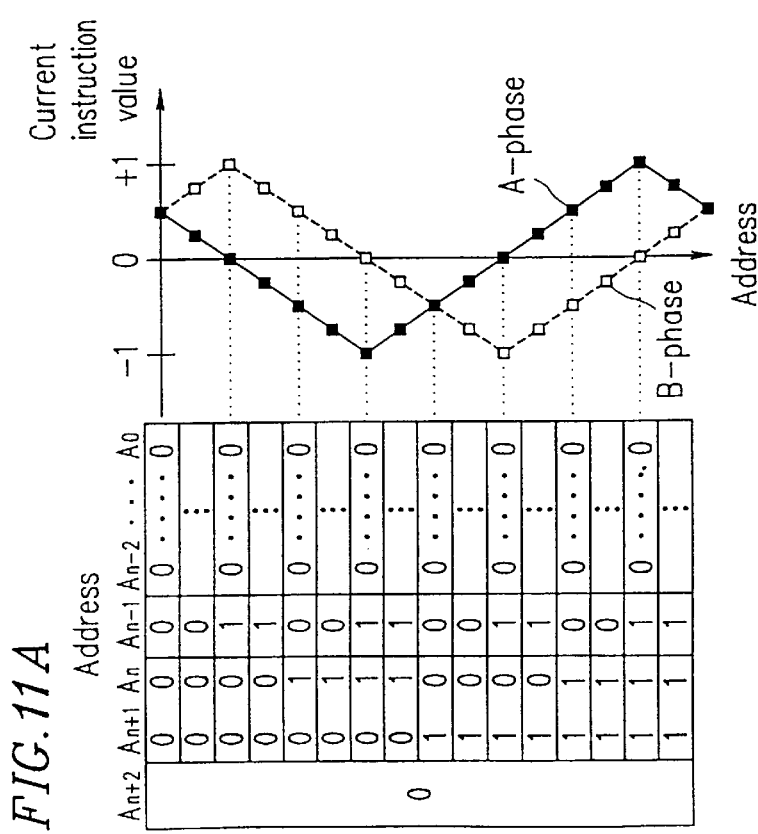

FIG. 11A shows a current table for a micro step drive similar to a conventional current table, while FIG. 11B shows a current table similar to the current table of the first example. In the third example, the stepping motor is driven by alternately using these two current tables.

In the following description, the division number is assumed to be an n-th power of two. The current tables shown in FIGS. 11A and 11B are stored in the upper address area and the lower address area of the addresses of the ROMs 14a and 14b. The data stored in the ROM 14a (the data for the A-phase) represents the current instruction values as indicated by the solid line on the right side of each of FIGS. 11A and 11B, while the data stored in the ROM 14b (the data for the B-phase) represents the current instruction values as indicated by the broken line on the right side of each of FIGS. 11A and 11B. The respective data are stored at the corresponding addresses shown on the left side of each of FIGS. 11A and 11B.

More specifically, the current table for a conventional micro step drive shown in FIG. 11A where the stable points are disposed at regular intervals (however, the interval is not always required to be regular) and a uniform stiffness characteristic is exhibited is stored at the addresses where the bit $A_{n+2}$ is "0" among the plurality of bits $A_{n+2}$ to $A_0$ for the address input of the ROMs. The current table of the first example shown in FIG. 11b is stored at the addresses where the bit $A_{n+2}$ is "1".

The current table of FIG. 11A stored at the addresses where the bit $A_{n+2}$ is "0" satisfies the following conditions. That is to say, the data stored at the addresses where the bit $A_{n-1}$ at the address input of the ROMs 14a and 14b is "1" and the bits $A_{n-2}$ to $A_0$ are "0" correspond to the data, shown in FIG. 11B, stored at the addresses where the bits $A_{n+2}$ and $A_{n-1}$ at the address input of the ROMs 14a and 14b are "1" and the bits $A_{n-2}$ to $A_0$ are "0".

The current table shown in FIG. 11B stored at the addresses where the bit $A_{n+2}$ is "1" satisfies the following conditions. That is to say, the data for the two-phase excitation drive is stored at the addresses where all the lower bits $A_{n-1}$ to $A_0$ are "0" at the address input of the ROMs 14a and 14b; and the data for the one/two-phase excitation drive is stored at the addresses where the bit $A_{n-1}$ is "1" and the bits $A_{n-2}$ to $A_0$ are "0" at the address input. A data is supplemented between the data for the two-phase excitation drive and the data for the one/two-phase excitation drive by interpolating the data with an appropriate monotonically increasing (or decreasing) function.

An up/down counter 15 having a width of (n+2) bits receives a direction instruction DIR indicating the moving direction of the head at an up/down input terminal UP/DOWN, and receives a moving pulse CLK of the head at a clock input terminal CK, thereby outputting address signals ($A_{n+1}$ to $A_0$) having a width of (n+2) bits. In the case where the direction instruction DIR is "1", the up/down counter 15 performs an increment operation for the addresses one by one in the leading edge of the moving pulse CLK. On the other hand, in the case where the direction instruction DIR is "0", the up/down counter 15 performs a decrement operation for the addresses one by one in the leading edge of the moving pulse CLK. The up/down counter 15 cyclicly outputs the addresses. That is to say, the direction instruction DIR indicating the moving direction of the head is input to the up/down input terminal UP/DOWN, and the moving pulse CLK of the head is input to the clock input terminal CK of the up/down counter 15.

A switching timing adjuster 16 receives a switching instruction MS/2P and the outputs $A_{n-1}$ to $A_0$ of the up/down counter 15 as the input, thereby outputting a current table selection signal SEL and a mask instruction /MSK. The current table selection signal SEL output from the switching timing adjuster 16 is supplied to the address input $A_{n+2}$ of the ROMs 14a and 14b, so as to select the current tables shown in FIGS. 11A and 11B. The mask instruction /MSK output from the switching timing adjuster 16 is input to a masker 17 for masking the lower bits $A_{n-1}$ to $A_0$ at the output of the up/down counter 15. An address signal masked or unmasked based on the mask instruction /MSK is input to the ROMs 14a and 14b.

The switching timing adjuster 16 includes: D flip-flops 16a and 16b functioning as an address switching state latch and a memory selection state latch, respectively; AND gates 16c, 16d and 16f and a NAND gate 16e functioning as decoders. The latches (or the D flip-flops 16a and 16b) for maintaining the states of the current table selection signal SEL and the mask instruction /MSK are initialized to be "0" by a resetting signal (not shown). When all the lower bits An−1 to A0 of the up/down counter 15 become "0", the output of the AND gate 16c becomes "1". When the bit An−1 of the up/down counter 15 is equal to "1" and the bits An−2 to A0 of the up/down counter 15 are equal to "0", the output of the AND gate 16d becomes "1". By latching the signal at the D-input with the outputs of the AND gates 16c and 16d, the D flip-flops 16a and 16b generate the mask instruction /MSK based on the following expression.

$$/MSK \leftarrow /\{/MS/2P \cdot SEL\}$$

where, /MSK is an inverted value of MSK; /MS/2P is an inverted value of MS/2P; and /{/MS/2P·SEL} is an inverted value of /MS/2P·SEL. As shown by the above expression, when SEL=1 (or in the state where the current table shown in FIG. 11B is selected) and the two-phase excitation drive is instructed, the state where the output An−1 of the up/down counter 15 is "1" and the outputs An−2 to A0 are "0" is detected in order to validate the masking, and a table selection signal SEL is output by latching the state shown by the following expression.

$$SEL \leftarrow MS/2P \cdot /MSK$$

The above expression shows that an appropriate current table is selected in accordance with the switching instruction MS/2P when /MSK=1, or when the mask is removed.

Figure 12:
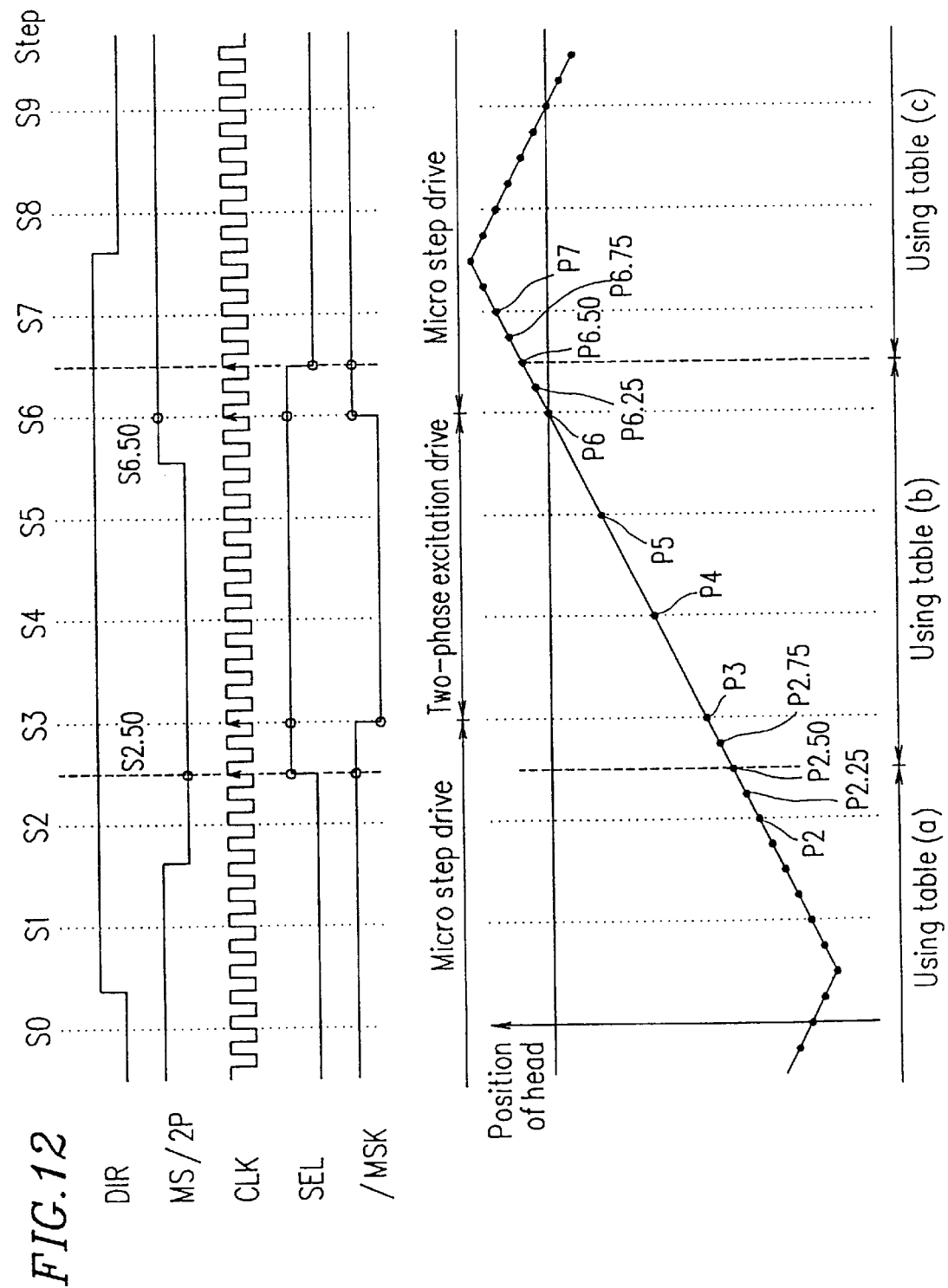
FIG. 12 shows the timings of the respective signals for the respective components.
Figure 13:
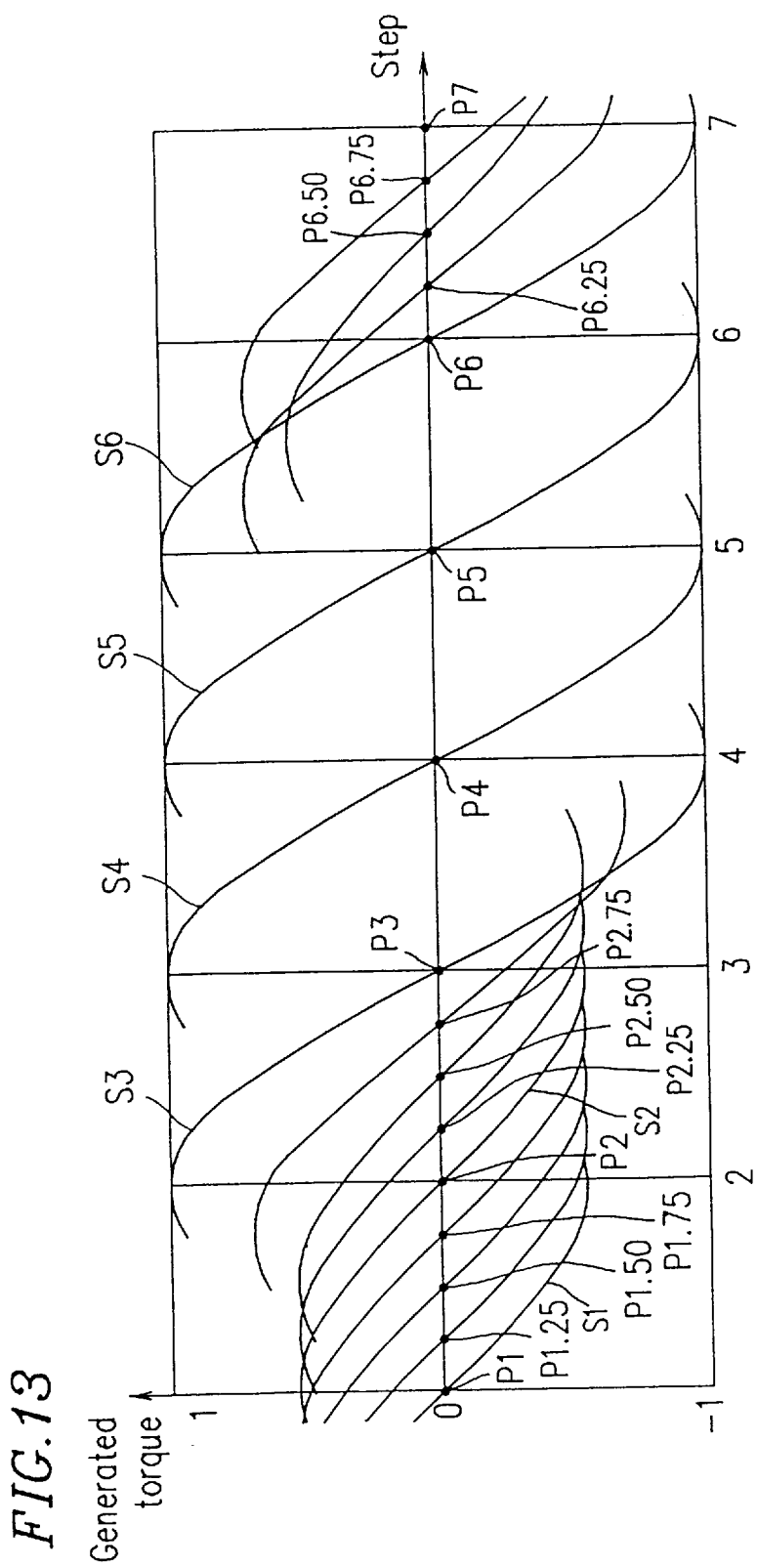
FIG. 13 is a graph showing the stiffness characteristics of the principal portions corresponding to the timings shown in FIG. 12.

Referring to FIGS. 10 to 13, the operation of the stepping motor driving apparatus of the third example will now be described. FIG. 12 shows the timings of the respective signals for the respective components. In FIG. 12, the abscissas indicate the steps. The waveforms shown in FIG. 12 indicate the waveforms of the direction instruction DIR, the switching instruction MS/2P, the moving pulse CLK, the table selection signal SEL, the mask instruction /MSK and the positions of the head from top to bottom. FIG. 13 shows the stiffness characteristics of the principal portions corresponding to the timings shown in FIG. 12. The division number for the micro steps is four (n=2). The excitation states S1 to S6 in FIG. 12 correspond to S1 to S6 of the stiffness characteristics shown in FIG. 13. In FIG. 13, P1, P2, P3 and the like are "stable points" where the rotor 6 pauses. By sequentially switching the excitation states in the order of S1→S2→S3→, and the like, the rotor 6 rotates at the positions P1→P2→P3→, and the like. As a result, the rotation movement of the rotor 6 of the stepping motor 3 is converted into linear movement, and the head 2 is moved.

The switching of the current tables will now be described in the sequential order of the excitation states S1 to S0. In the initial excitation state S1, the head is moving in the direction defined by the direction instruction DIR by the micro step drive. The rotor 6 of the stepping motor 3 rotates a 0.25 step at each of the positions P1→P1.25→P1.50→P1.75→P2 and the transition is performed from the state S1 to the state S2. In this case, the drive width is one fourth as large as the width for the two-phase excitation drive because the division number is four. Since the drive method is switched from the micro step drive into the two-phase excitation drive on the way of the transition from the state S1 to the state S2, the switching instruction MS/2P is changed. The moment the state where the lower bits A0 to An−1 of the up/down counter 15 become "0", i.e., when the state S2 begins, the output of the AND gate 16c becomes "1". By latching the signal at the D-inputs with the outputs of the AND gates 16c and 16d, the D flip-flops 16a and 16b output the mask instruction /MSK based on the switching instruction MS/2P and the table selection signal SEL. In this stage, since the table selection signal SEL is "0", the mask remains removed, and the mask instruction /MSK is not changed. Next, when the state where the lower bits A0 to An−2 of the up/down counter 15 become "0" and An−1 becomes "1", i.e., when the state S2.50 begins, the output of the AND gate 16d becomes "1". The current table selection signal SEL is latched based on the states of the switching instruction MS/2P and the mask instruction /MSK, so that the mask instruction /MSK is output. In the state S2.50, the table selection signal SEL is changed from "0" into "1" in the leading edge of the moving pulse CLK. In other words, the current table shown in FIG. 11A is replaced by the current table shown in FIG. 11B. Until the state S2.50 begins, the micro step drive is performed using the current table shown in FIG. 11A. That is to say, the rotor 6 rotates a 0.25 step at each of the stable points P2→P2.25→P2.50 of the stiffness characteristics shown in FIG. 13.

After the moving pulse CLK is further input, when the state where the lower bits A0 to An−1 of the up/down counter 15 become "0", i.e., when the state S3 begins, by latching the signal at the D-input based on the switching instruction MS/2P and the table selection signal SEL, the mask instruction /MSK is output. In the state S3, the mask instruction /MSK is changed from "1" into "0" and the addresses are masked. In the period between the states S2.50 and S3, the micro step drive is performed using the current table shown in FIG. 11B. In this period, the rotor 6 rotates at the stable points P2.50→P2.75→P3 of the stiffness characteristics shown in FIG. 13. As shown in the stiffness characteristics in FIG. 13, the torque generated in the case of driving the rotor using the current table shown in FIG. 11B increases in the period between the states S2.50 and S3. As a result, the stiffness characteristics in the state S3 correspond to the stiffness characteristics for the two-phase excitation drive.

In the period after the state S1 begins and immediately before the state S3 begins, the lower bits A0 to An−1 at the address of the up/down counter 15 are unmasked. When the state S3 begins, the lower bits at the address are masked. When the lower bits at the address of the up/down counter 15 are masked, the current instruction values, in the current table shown in FIG. 11B, stored at the addresses where all the lower bits are "0", or the current instruction values for the two-phase excitation drive are output from the ROMs 14a and 14b. If the moving pulse CLK continues to be input to the up/down counter 15, the upper bits An and An+1 of the up/down counter 15 are changed, so that only the data in the current table for the two-phase excitation drive is output.

In FIGS. 11A and 11B, the two-phase excitation drive is performed in the period from the states S3 to S6 during which the mask instruction is valid. In this period, the rotor 6 rotates at the stable points P3→P4→P5→P6 of the stiffness characteristics shown in FIG. 13. As shown in the stiffness characteristics in FIG. 13, the torque generated in the two-phase excitation drive is larger than the torque generated in the micro step drive, so that the head 2 can be moved at a higher speed.

Next, in the period between the states S5 and S6, the switching instruction MS/2P is changed, so that the two-phase excitation drive is switched into the micro step drive. In this case, when the state where the lower bits A0 to An−1 of the up/down counter 15 become "0", i.e. when the state S6 begins, the signal at the D-input is latched based on the switching instruction MS/2P and the current table selection signal SEL, so that the mask instruction /MSK is output. In the state S6, the mask instruction /MSK is changed from "0" into "1" and the masking is removed by the masker 17. As a result, the rotor 6 rotates a 0.25 step at each of the positions P6→P6.25→P6.50, so that the transition from the state S6 to the state 6.50 is performed.

After the moving pulse CLK is further input, when the state where the lower bits A0 to An−2 of the up/down counter 15 become "0" and An−1 becomes "1", i.e., when the state S6.50 begins, the signal at the D-input is latched based on the switching instruction MS/2P and the mask instruction /MSK, so that the table selection signal SEL is output. As a result, in the state S6.50, the current table selection signal SEL is changed from "1" into "0" in the leading edge of the moving pulse CLK. In other words, the current table shown in FIG. 11B is replaced by the current table shown in FIG. 11A. After the state S6.50 begins, the micro step drive is performed by every 0.25 step using the current table shown in FIG. 11A. That is to say, the rotor 6 rotates at the stable points P6.50→P6.75→P7, and the like of the stiffness characteristics shown in FIG. 13.

In this third example, the drive method can be switched smoothly between the micro step drive and the two-phase excitation drive as shown in the stiffness characteristics in the states S1 to S7 in FIG. 13. In addition, the head can be precisely moved at low speeds by performing the micro step drive and the head can be moved at high speeds using a large torque generated by the two-phase excitation drive.

By inverting the direction instruction DIR, the up/down of the up/down counter 15 is inverted. When the direction instruction DIR is inverted in the period between the states S7 and S8, the head 2 begins to move in the reverse direction. After the direction instruction DIR is inverted, the drive method can be switched between the micro step drive and the two-phase excitation drive in the same way as the above-described operation except that the direction is inverted.

As described above, according to the method of the third example, the data for a conventional micro step drive (hereinafter, referred to as a table (a)) is stored at the lower addresses of the ROMs 14a and 14b, while the current data similar to the data described in the first example (hereinafter, referred to as a table (b)) is stored at the upper addresses of the ROMs 14a and 14b. In addition, the data for a conventional micro step drive and the data of the second example include a plurality of data indicating the same current value, e.g., four data in a period.

Therefore, if the micro step drive, performed by alternately using the tables (a) and (b), is switched at the addresses of the tables (a) and (b) where the data indicating the same current value is stored, then the tables (a) and (b) can be smoothly switched. In addition, using the table (b), the drive method can be switched smoothly between the micro step drive and the two-phase excitation drive in the same way as in the first example. As is apparent from the foregoing description, by smoothly switching the drive method between the micro step drive and the two-phase excitation drive, the head can be moved at high speeds during the seek operation and the head can be moved with high resolution without applying a large disturbance to the head during the recording/reproducing operations.

The third example is different from the first example in that the power consumption during the micro step drive can be suppressed; that the drive method can be switched more smoothly between the micro step drive and the two-phase excitation drive; and that the micro step can be performed more smoothly.

In the first and the third examples, a D/A converter and an amplifier are used to implement a current driver. However, a current driver can be implemented in other ways. For example, a current driver can be implemented by a pulse width modulation (PWM) drive in which a switching transistor connected to an I/O port is turned on/off by operating a timer by programming a digital signal processor (DSP).

In the first to third examples, a stepping motor driving apparatus is implemented using hardware. Alternatively, the driving apparatus can be implemented using software. For example, such an apparatus is realized by substituting a memory variable inside a DSP, a flag variable inside a memory, and an AND operation of an accumulator for the up/down counter, the latch of the switching timing adjuster, and the masking operation, respectively. Moreover, a current table is realized as a function for generating current instruction values. This function can be written as a subroutine in a program of a DSP.

In the foregoing examples, the current table is stored in the ROMs. Alternatively, the current table may be stored in a random access memory (RAM) or a static random access memory (SRAM).

In the third example, in order to switch the drive method between the two-phase excitation drive and the micro step drive, the current instruction values commonly used for the two-phase excitation drive and the micro step drive are stored at the addresses where all the lower bits of the ROM are "0". However, the addresses where the commonly used current instruction values are stored are not limited to the addresses where all the lower bits are "0", but may be other addresses. In such a case, in order to detect the lower bits of the addresses where the commonly used current instruction values are stored, not a decoder consisting of a small number of logic circuits (AND gates 11a and 16c), but a decoder having a more complicated logic design is required. Then, the maskers 12 and 17 cannot be implemented in a simple configuration as described in the third example. For example, a circuit for selectively outputting the lower bits (variable values) at the output of the up/down counter 15 and the lower bits (fixed values) of the addresses where the commonly used current instruction values are stored is required.

In the third example, at the address at which the two current instruction tables are switched, the uppermost bit of the lower bits is "1", and the other bits are "0". This switching address is not limited to the above-mentioned particular address, either. However, the switching address is required to be distant to a certain degree from the lower bits where the commonly used current instruction values are stored. In addition, the number of the addresses where the tables are switched can be any arbitrary number. In such a case, a decoder having a logic design more complicated than that of the decoder having a single gate (AND gate 16d) is required as described above.

The current table described in the second example can be used as the table (b). In such a case, when the micro step drive is performed using the table (b), the torque can be partially improved without changing the positions of the stable points.

EXAMPLE 4

Figure 14:
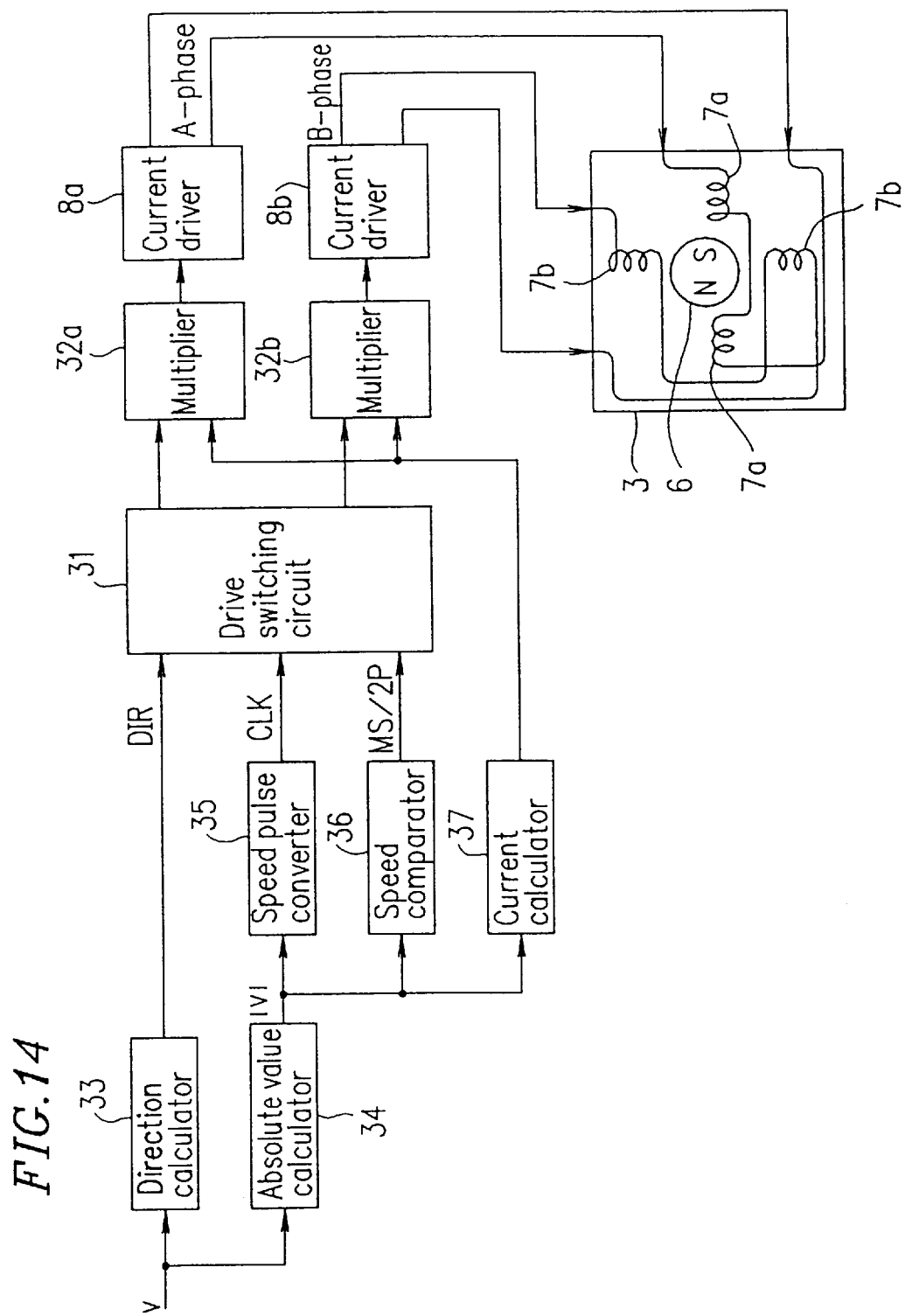
FIG. 14 is a block diagram showing a configuration of a stepping motor driving apparatus according to a fourth example of the present invention.

FIG. 14 is a block diagram showing a configuration of a stepping motor driving apparatus according to a fourth example of the present invention. The mechanical structure required for applying the stepping motor driving apparatus of the fourth example to a head driving apparatus is the same as that shown in FIG. 1. A drive switching circuit 31 switches the drive method of the stepping motor between the two-phase excitation drive and the micro step drive. The drive switching circuit 31 performs the same function as that performed by the portions from the input (the switching instruction MS/2P, the direction instruction DIR and the moving pulse CLK) to the ROMs 9a and 9b or the ROMs 14a and 14b of the stepping motor driving apparatus of the first example shown in FIG. 2 or the stepping motor driving apparatus of the third example shown in FIG. 10. The fourth example is different from the first and the third examples in that the multipliers 32a and 32b vary the current instruction values input to the current drivers 8a and 8b, and that a drive switching signal is generated from a speed instruction value v. The speed instruction value v is a signal generated by an external servo circuit (not shown) or the like, and is a digital data indicating the moving speed and direction of the head by an absolute value of the signal and the sign thereof, respectively.

The direction instruction DIR, the moving pulse CLK and the switching instruction MS/2P for switching the drive method between the two-phase excitation drive and the micro step drive are generated in the following manner, and input to the drive switching circuit 31.

A direction calculator 33 receives the speed instruction value v as an input and calculates the direction instruction DIR, thereby outputting the instruction to the drive switching circuit 31. In other words, the direction calculator 33 outputs the direction instruction DIR depending upon whether the speed instruction value v is positive or negative. For example, in the case where the speed instruction value v is expressed by a complement of two, the uppermost bit, or a so-called "sign bit" of the speed instruction value v is output to the drive switching circuit 31.

An absolute value calculator 34 receives the speed instruction value v as an input and outputs the absolute value thereof $|v|$ to a speed pulse converter 35, a speed comparator 36 and a current calculator 37 as an absolute speed. In the case where the speed instruction value v is expressed by a complement of two, the absolute value calculator 34 operates in the following manner. When the speed instruction value v is positive (or the sign bit is "0"), the absolute value calculator 34 outputs the input speed instruction value v without performing any processing thereto. On the other hand, when the speed instruction value v is negative (or the sign bit is "1"), the absolute value calculator 34 inverts all the bits of the speed instruction value v and outputs a value obtained by adding 1 to the result.

The speed pulse converter 35 outputs a pulse having a frequency proportional to the input absolute speed $|v|$ as a moving pulse CLK to the drive switching circuit 31.

Figure 15:
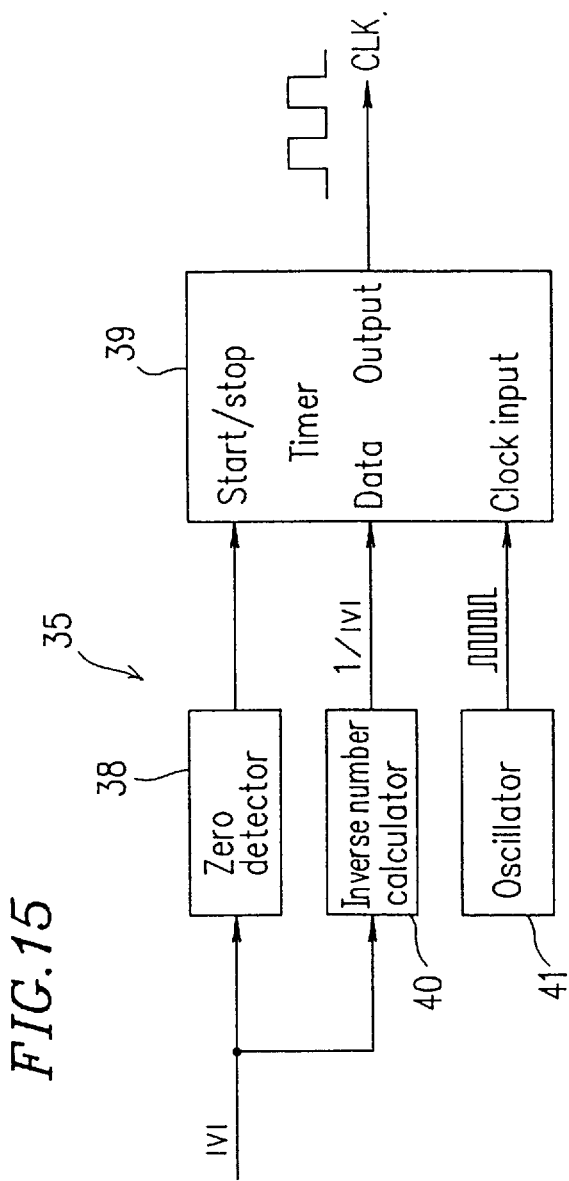
FIG. 15 is a block diagram showing a configuration of a speed pulse converter 35.

FIG. 15 is a block diagram showing a configuration of the speed pulse converter 35. A zero detector 38 supplies a signal for stopping a timer 39 to a start/stop terminal of the timer 39 when the zero detector 38 detects the absolute speed $|v|$ to be zero. In this case, the timer 39 does not output the moving pulse CLK from the output terminal. Based on the signal input to the start/stop terminal, the timer 39 starts/stops counting the clocks input to a clock input terminal. An inverse number calculator 40 receives the absolute speed $|v|$ as an input and outputs the inverse number $1/|v|$ of the absolute speed $|v|$ to a data terminal of the timer 39. An oscillator 41 outputs a reference clock of the timer 39 to the clock input terminal of the timer 39. The timer 39 counts the reference clocks input from the clock input terminal. When the count number of the reference clocks reaches $1/|v|$, the timer 39 outputs a pulse from the output terminal and reads a new $1/|v|$ from the data terminal. As a result, the speed pulse converter 35 outputs a pulse signal having a frequency proportional to the absolute speed $|v|$ from the output terminal.

Figure 16:
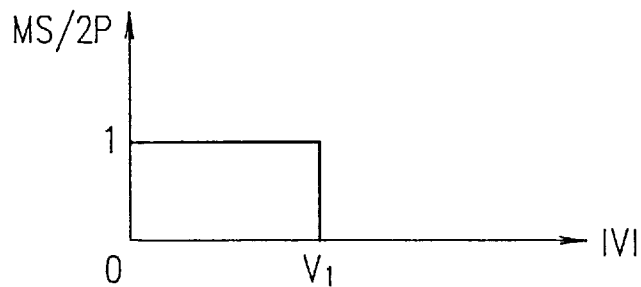
FIG. 16 is a graph showing the relationship between an absolute speed |v| and a switching instruction MS/2P.

The speed comparator 36 switched the drive method of the stepping motor between the micro step drive and the two-phase excitation drive based on the absolute speed $|v|$ and a first setting speed v1. FIG. 16 is a graph showing the relationship between the absolute speed $|v|$ and the switching instruction MS/2P. In FIG. 16, the abscissas indicate the absolute speed $|v|$ and the ordinates indicate the switching instruction MS/2P. As shown in FIG. 16, when the absolute speed $|v|$ is equal to or higher than v1, the speed comparator 36 outputs "0" (indicating the two-phase excitation drive) as MS/2P. On the other hand, when the absolute speed $|v|$ is lower than v1, the speed comparator 36 outputs "1" (indicating the micro step drive) as MS/2P.

Figure 17:
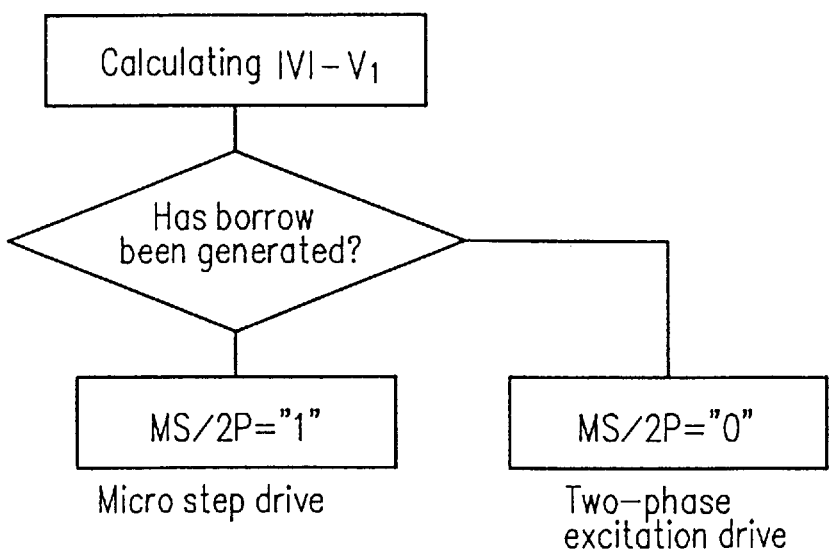
FIG. 17 shows a calculation procedure performed by a speed comparator 36.

FIG. 17 shows a calculation procedure performed by the speed comparator 36. According to the calculation procedure shown in FIG. 17, the first setting speed v1 is subtracted from the absolute speed $|v|$. Depending upon whether a borrow is generated by the subtraction or not, the relationship between the magnitudes of the two values is determined. This calculation demonstrates the function shown in FIG. 16.

Next, the components for controlling the current instruction values will be described. As shown in FIG. 14, the two outputs from the drive switching circuit 31 are input to the current drivers 8a and 8b via the multipliers 32a and 32b, respectively. The multipliers 32a and 32b receive the signals output from the current calculator 37, and amplify the outputs from the drive switching circuit 31 with a coefficient corresponding to the signals. The current calculator 37 supplies a signal corresponding to the value of the absolute speed $|v|$ to the multipliers 32a and 32b.

Figure 18:
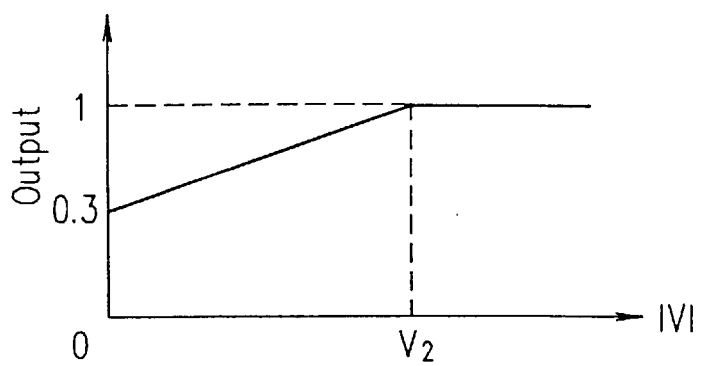
FIG. 18 is a graph showing the relationship between the absolute speed |v| and the output from a current calculator 37.

FIG. 18 is a graph showing the relationship between the absolute speed $|v|$ and the output from the current calculator 37. In FIG. 18, the abscissas indicate the absolute speed $|v|$ and the ordinates indicate the output from the current calculator 37. As shown in FIG. 18, when the absolute speed $|v|$ is smaller than a second setting speed v2 (>0), the output from the current calculator 37 increases monotonically. On the other hand, when the absolute speed $|v|$ is equal to or larger than the second setting speed v2, the output from the current calculator 37 is at a constant value of 1. For simplification, the monotonically increasing portion is expressed by a linear function in FIG. 18.

Figure 19:
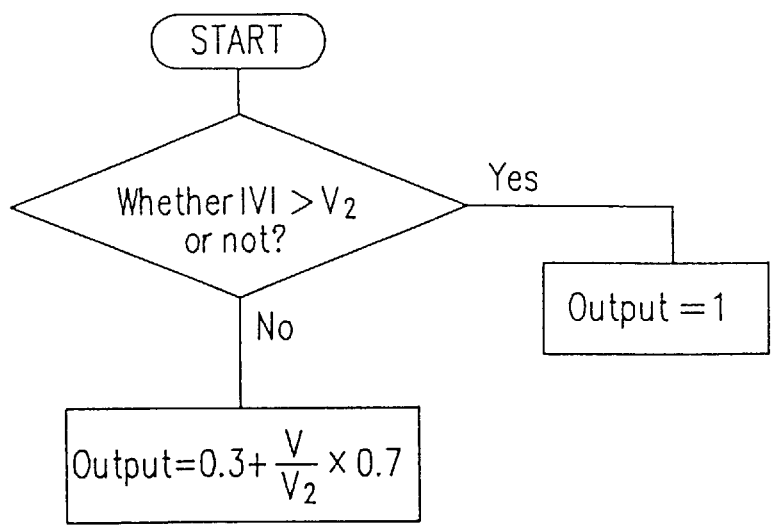
FIG. 19 shows the calculation procedure for realizing the function shown in FIG. 18.

FIG. 19 shows the calculation procedure for exhibiting the function shown in FIG. 18. First, the absolute speed $|v|$ and the second setting speed v2 are compared. If the absolute speed $|v|$ is larger than the second setting speed v2, a maximum value of 1 is output. Otherwise, the output is calculated based on the value of the absolute speed $|v|$. In FIGS. 18 and 19, the relationship between the absolute speed $|v|$ and the outputs is expressed as follows: (output) $=0.3+0.7\times|v|/v2$.

Figure 20:
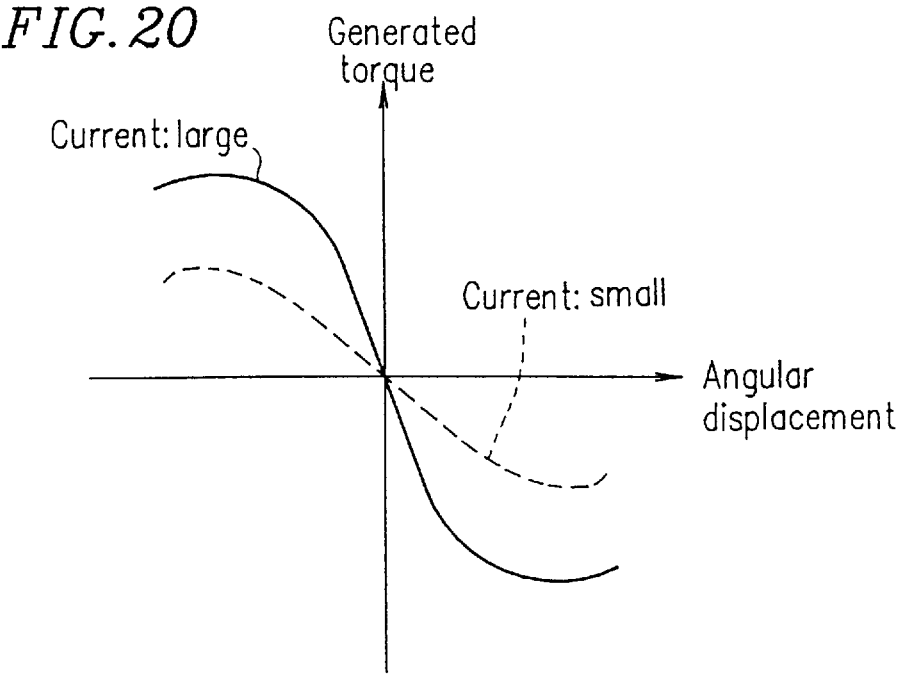
FIG. 20 is a graph showing the stiffness characteristics at the stable points in accordance with the variation of the current.

The operation of the stepping motor driving apparatus of the fourth example will now be described with reference to FIGS. 14 and 20. Since the drive switching circuit 31 shown in FIG. 14 operates in the same way as the counterparts in the first and the third examples, the description thereof will be omitted herein. In the fourth example, the position of the head is controlled by the speed instruction value v. Hereinafter, the operation for controlling the current by the output of the current calculator 37 and the multipliers 32a and 32b will now be described. The multipliers 32a and 32b do not vary the ratio of the current instruction value output from the drive switching circuit 31 to the coil 7a to the current instruction value output from the drive switching circuit 31 to the coil 7b. Therefore, the multipliers 32a and 32b vary the inclination of the curve representing the stiffness characteristics, or the torque to be generated in the vicinity of the stable points without hardly varying the positions of the stable points of the stiffness characteristics. FIG. 20 shows the stiffness characteristics at the stable points in accordance with the variation of the current. In FIG. 20, the ordinates indicate the generated torque and the abscissas indicate the angular displacement from the stable points. The curve indicated by the solid line shows the case where the current is large, while the curve indicated, by the broken line shows the case where the current is small.

The stepping motor incorporates a positional control system (not shown) such as a servo circuit. The stiffness characteristics show the relationship between the angular displacement and the torque to be applied to the rotor at the angular displacement. Varying the inclination of the curve representing the stiffness characteristics is equivalent to varying the gain of the positional control. When the gain of the positional control is large, the vibration of the head during the movement thereof becomes large, so that the tracking control is adversely affected. On the other hand, when the gain of the positional control is small, the precision of the movement of the head is degraded. Therefore, as shown in FIG. 18, the current calculator 37 controls the multipliers 32a and 32b so that a small current is generated with respect to the speed instruction value instructing a low speed, and that a large current is generated with respect to the speed instruction value instructing a high speed. In other words, the current calculator 37 controls the multipliers 32a and 32b so that a control gain becomes small when the moving speed of the head is low, and that a control gain becomes large when the moving speed of the head is high. When the moving speed of the head is low, the head is not required to exhibit instantaneous response. Accordingly, even when the gain is small, no inconvenience is caused. On the other hand, when the moving speed of the head is high, the increment of the load caused by the friction is compensated for by increasing the gain. If the control is performed in the above-described manner, the generation of the vibration can be suppressed when the head is moving at a low speed, though the generation of the vibration cannot be prevented when the head is moving at a high speed. As a result, the head can be advantageously decelerated smoothly after the seek operation is finished and the head can be smoothly moved to a close track.

Varying the gain of the positional control is equivalent to varying the electric elasticity. Therefore, it is possible to realize a head driving apparatus where the frequency of the moving pulse is not in accord with the resonance frequency determined by the mechanical and electric elasticity. As a result, it is possible to prevent an increase in the vibration caused by the accordance between the frequency of the moving pulse and the resonance frequency.

A head driving apparatus using the stepping motor driving apparatus of the fourth example controls the drive current of the stepping motor in accordance with the speed instruction values of the head. As a result, it is possible to compensate for the friction caused by the moving speed of the head when the head is moving at a high speed. On the other hand, when the head is moving at a low speed, the current is reduced. Consequently, the vibration (considerably large in the two-phase excitation drive, in particular) caused by intermittent movement of the head can be reduced, and the vibration of the head can also be reduced by performing the micro step drive at the fine steps.

Since the positional control can be performed by using the speed instruction values, a control algorithm by using a conventional linear motor is applicable in the fourth example. Moreover, an electromagnetic resonance mode can be changed by controlling the drive current. In addition, the moving speed of the head can be smoothly accelerated from low to high. The power consumption can also be reduced by reducing the drive current when the head is moving at a low speed.

Furthermore, by varying the electric elasticity, the head can be controlled so that the frequency of the moving pulse is not in accord with the resonance frequency determined by the mechanical and electric elasticity. As a result, it is possible to reduce the adverse effects to be given to a tracking servo system.

In the fourth example, the second setting speed v2 is set to be lower than the first setting speed v1. Alternatively, the second setting speed v2 can be set to be higher than the first setting speed v1. In such a case, the power can be controlled not only in the micro step drive but also in the two-phase excitation drive. As a result, even in the case of performing the two-phase excitation drive, vibrations can be reduced and the resonance mode can be changed. Therefore, by appropriately controlling the resonance mode, the stepping motor can be driven by a drive pulse having a frequency higher than that of a conventional drive pulse.

EXAMPLE 5

A configuration of a stepping motor driving apparatus of a fifth example of the present invention will now be described with reference to FIGS. 21 to 26, and an operation of the stepping motor driving apparatus of the fifth example of the present invention will now be described with reference to FIGS. 27 to 29.

Figure 21:
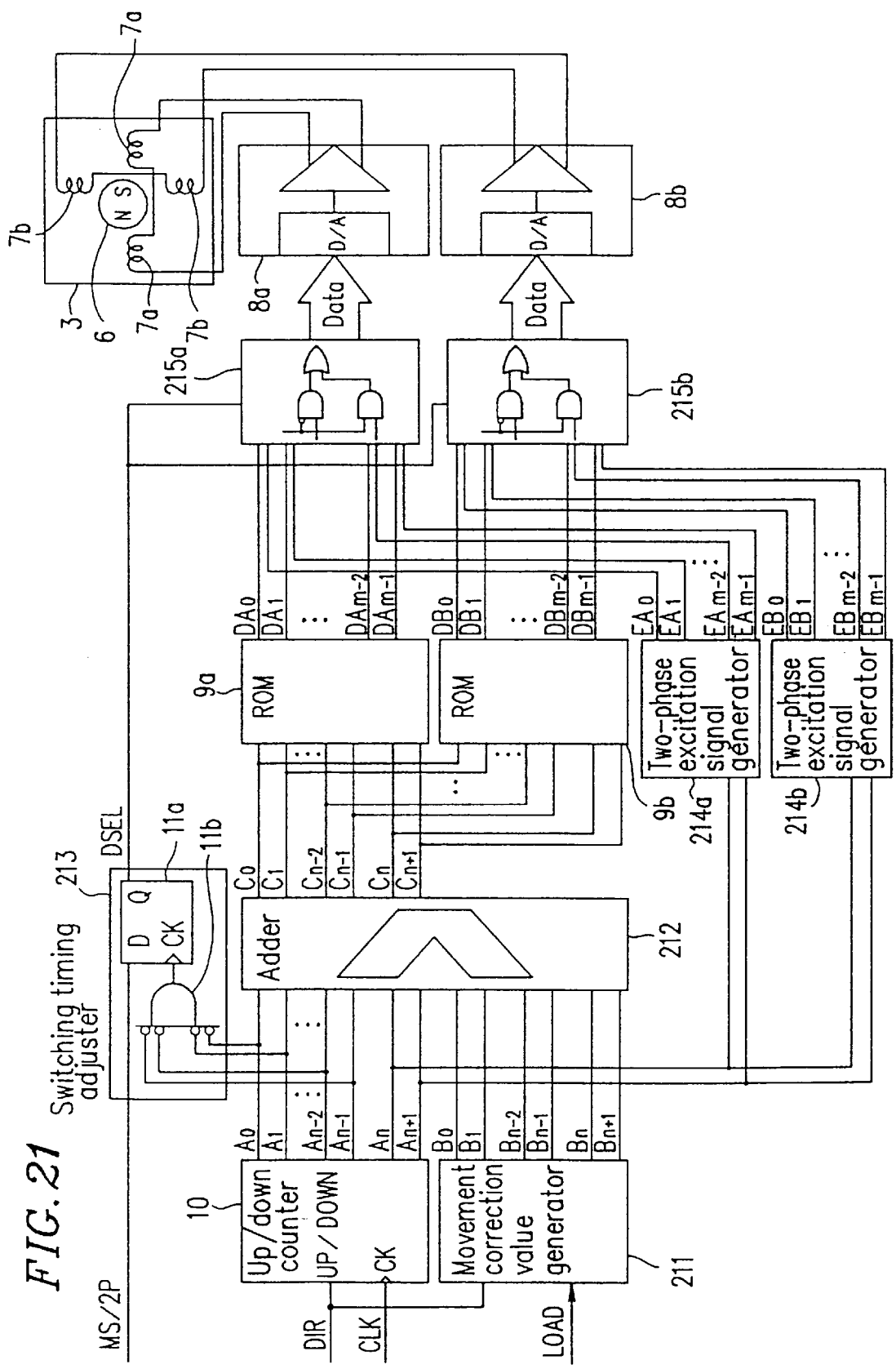
FIG. 21 is a block diagram showing a configuration of a stepping motor driving apparatus according to a fifth example of the present invention.

FIG. 21 is a block diagram showing a configuration of the stepping motor driving apparatus according to the fifth example of the present invention. Multiplexers 215a and 215b select the data from ROMs 9a and 9b and the data from two-phase excitation signal generators 214a and 214b in response to a data selection signal DSEL, thereby outputting the selected data to the current drivers 8a and 8b. The digital data input to the current drivers 8a and 8b indicate the current instruction values.

Figure 22:
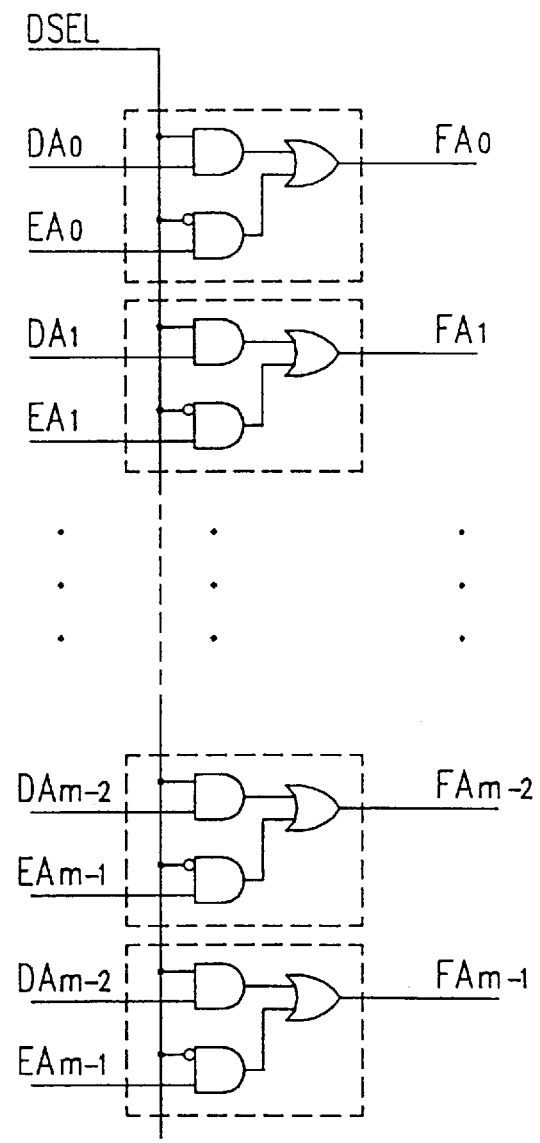

FIG. 22 is a circuit diagram showing an exemplary configuration of the multiplexer 215a. The other multiplexer 215b also has a similar configuration. When the data selection signal DSEL is "0", the multiplexer 215a outputs the digital signals DA0 to DAm−1 from the ROM 9a to FA0 to FAm−1, where "m" is a number of a bit width of the outputs of the multiplexer 215a and 215b. When the data selection signal DSEL is "1", the multiplexer 215a outputs the digital signals EA0 to EAm−1 from the two-phase excitation signal generator 214a to FA0 to FAm−1. In both cases, the data output to FA0 to FAm−1 is input to the current driver 8a. The multiplexer 215b operates similarly to the multiplexer 215a. That is to say, the multiplexer 215b selects the digital signals DB0 to DBm−1 from the ROM 9b and the digital signals EB0 to EBm−1 from the two-phase excitation signal generator 214b and outputs the selected digital signals to the current driver 8b as data output FB0 to FBm−1.

Figure 23:
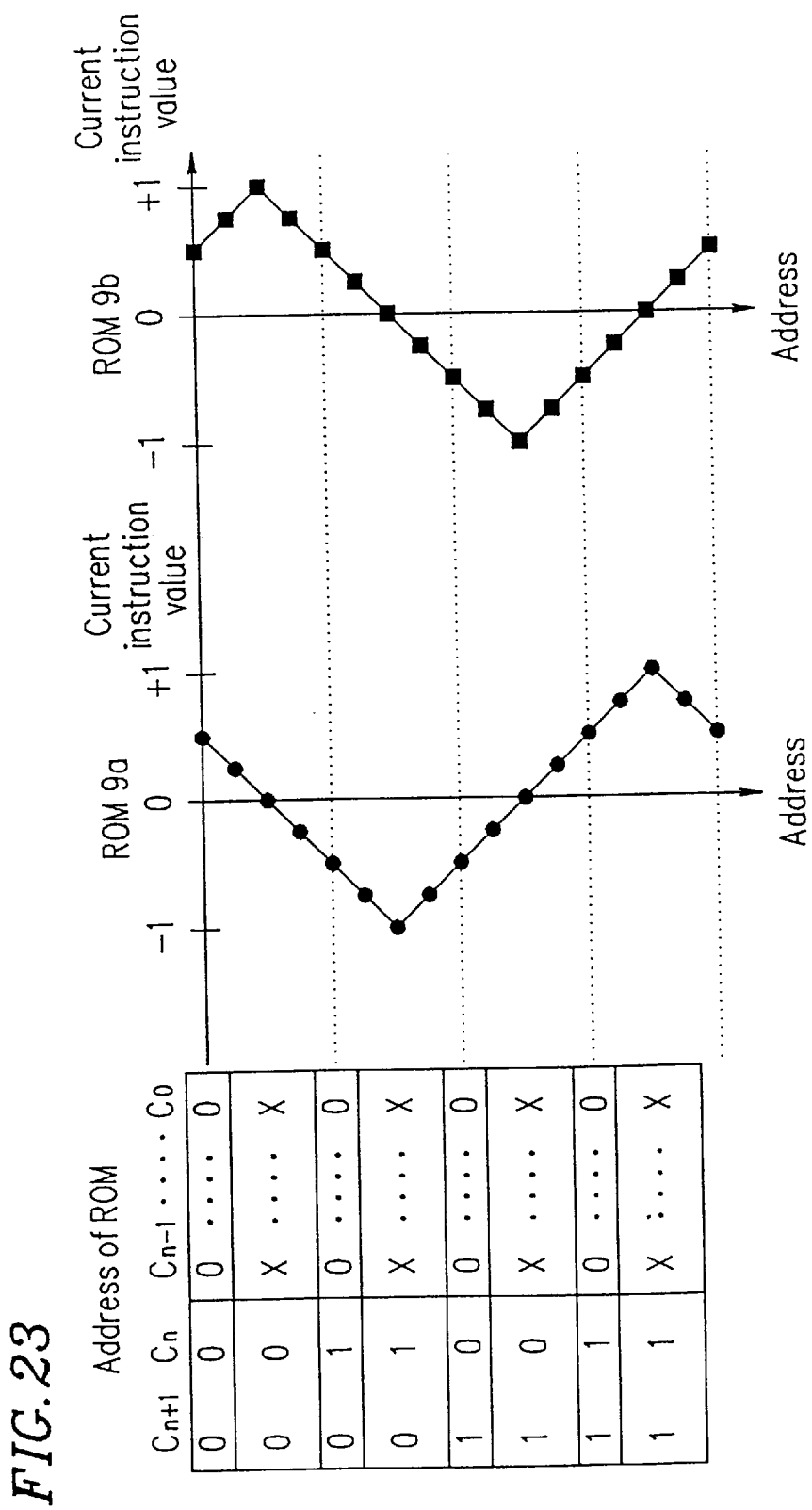
FIG. 23 shows the current instruction values stored in the ROMs 9a and 9b.

FIG. 23 shows graphs showing the current instruction values stored in the ROMs 9a and 9b. The graph indicated by the dots • in the center of FIG. 23 shows the current instruction values stored in the ROM 9a, while the graph indicated by the dots ■ on the right side of FIG. 23 shows the current instruction values stored in the ROM 9b. The digital data representing the current instruction values are stored at the corresponding addresses shown on the left side of FIG. 23. The data can be the current instruction values for a conventional micro step drive. Though the current instruction values are varied in a triangular wave in FIG. 23, the values may be varied in a sine wave. The division number for the micro step drive is set to be an n-th power of two. By designating the addresses Cn+1 to C0 having a width of (n+2) bits, the current instruction values stored in the ROMs 9a and 9b are read out. For simplification, the graphs where the micro step drive is performed by using a division number of 4 (n=2) are shown.

A movement correction value generator 211 receives the direction instruction DIR and a load LOAD of the moving body as inputs, thereby outputting movement correction values Bn+1 to B0 having a width of (n+2) bits to an adder 212. The adder 212 adds the address signals An+1 to A0 and the movement correction values Bn+1 to B0, thereby generating corrected addresses Cn+1 to C0 and supplying the addresses to the address inputs of the ROMs 9a and 9b.

Figure 24:
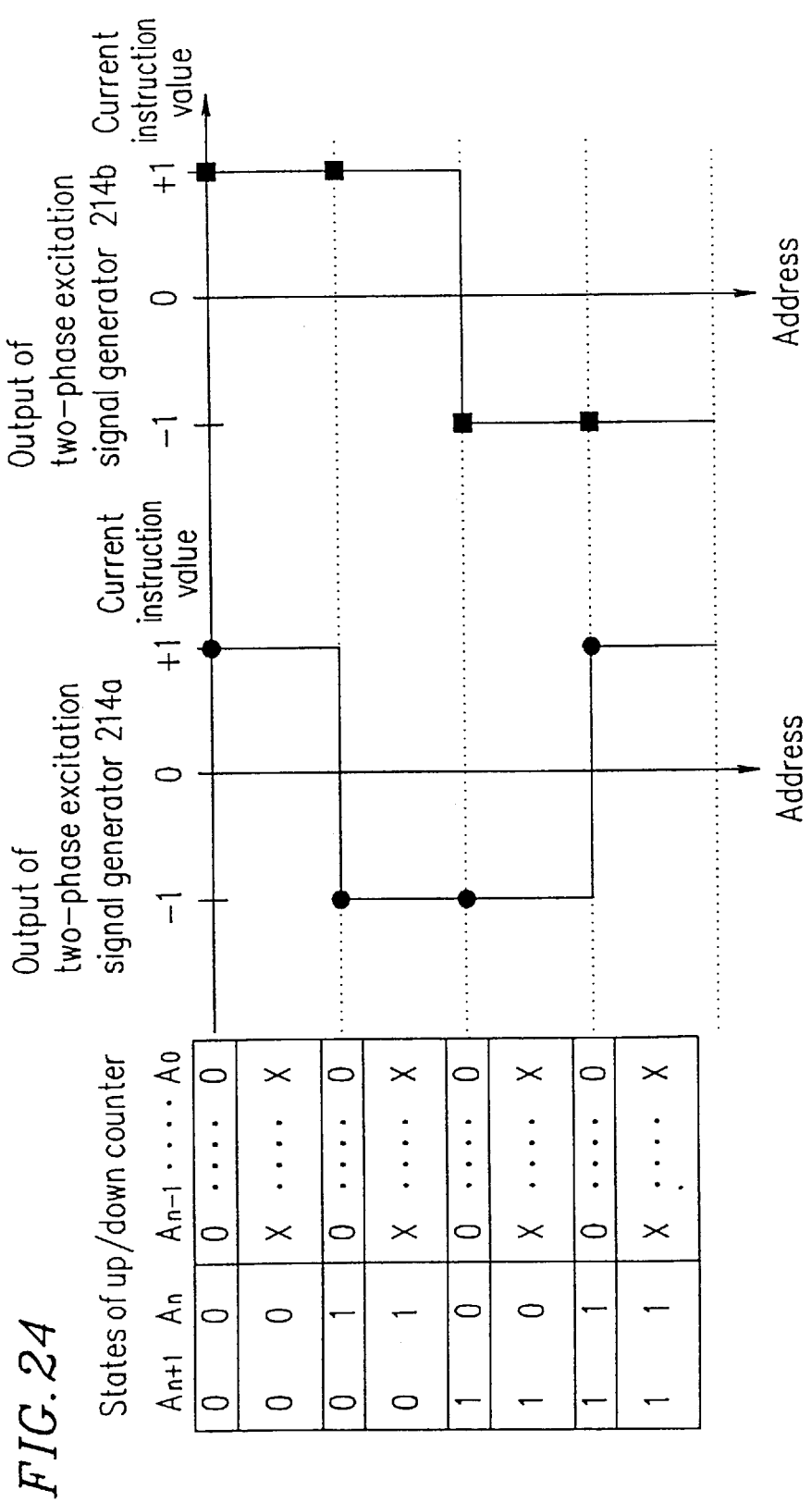
FIG. 24 shows the output signals generated by two-phase excitation signal generators 214a and 214b.

FIG. 24 shows graphs showing the output signals generated by the two-phase excitation signal generators 214a and 214b. The graph indicated by the dots • in the center of FIG. 24 shows the output signals generated by the two-phase excitation signal generator 214a, while the graph indicated by the dots • on the right side of FIG. 24 shows the output signals generated by the two-phase excitation signal generator 214b. These digital data representing the current instruction values are stored at the corresponding addresses shown on the left side of FIG. 24. These data can be the current instruction values for a conventional two-phase excitation drive.

FIG. 25A is a table showing the relationship between the inputs and the outputs of the two-phase excitation signal generators 214a and 214b. FIG. 25B is a circuit diagram showing an exemplary configuration of the two-phase excitation signal generators 214a and 214b for implementing the relationship shown in FIG. 25A.

A switching timing adjuster 213 performs the switching operation in response to the data selection signal DSEL by latching the switching instruction MS/2P with a signal indicating that all the lower bits A0 to An−1 at the output of the up/down counter 10 are "0". The switching timing adjuster 213 consists of a D flip-flop 11a and an AND gate 11b. The switching instruction MS/2P and the data selection signal DSEL of "0" denote the two-phase excitation drive. On the other hand, the switching instruction MS/2P and the data selection signal DSEL of "1" denote the micro step drive.

In the fifth example, when the drive method is switched between the micro step drive and the two-phase excitation drive, the phases of the current instruction values of the micro step drive and the two-phase excitation drive are shifted based on the movement correction values.

Figure 26A:
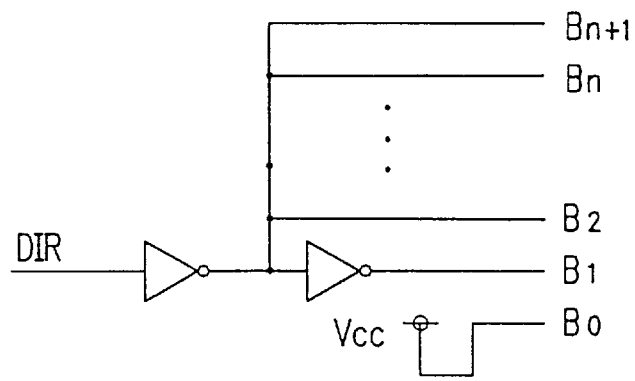

FIG. 26A is a table showing the relationship between the inputs and the outputs of the movement correction value generator 211. The relationship shown in FIG. 26A is applied to the case where the load to be given to the stepping motor by the moving body can be regarded as substantially constant. When the direction instruction DIR is "0", a movement correction value of "−3" is output. When the direction instruction DIR is "1", a movement correction value of "+3" is output.

Figure 26B:
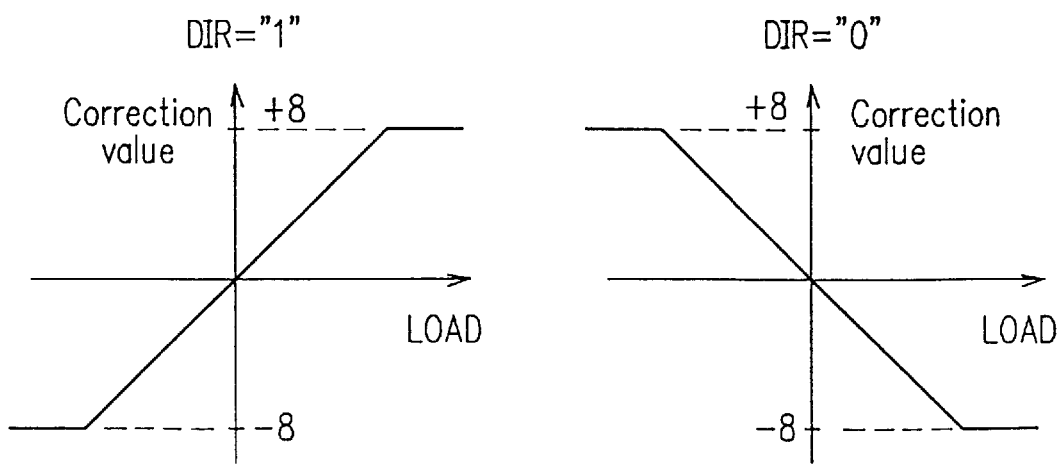
FIG. 26B shows the relationship between the load LOAD and the correction values to be applied when the movement correction value is varied substantially in proportion to the load given to the stepping motor by the moving body.

On the other hand, FIG. 26B shows the graphs showing the relationship between the load LOAD and the correction values to be applied to the case where the movement correction value is varied substantially in proportion to the load given to the stepping motor by the moving body. Whether the movement correction value is an increasing function of the load or a decreasing function of the load is determined depending upon the direction instruction DIR. In the relationship shown in FIG. 26B, the movement correction value does not exceed a predetermined value. This is because a "loss of synchronism", i.e., the rotation of the rotor at other stable point of the stiffness characteristics, is generated when the movement correction value is too large. The limitation of the movement correction value is necessary for stably rotating the stepping motor.

Hereinafter, the operation of the stepping motor driving apparatus of the fifth example will now be described with reference to FIGS. 27 and 28. FIG. 27 shows the timings of the respective signals for the respective components. The waveforms shown in FIG. 27 indicate the waveforms of the current instruction values in the A-phase, the current instruction values in the B-phase, the moving pulse CLK, the switching instruction MS/2P, the data selection signal DSEL, and the direction instruction DIR, while the abscissas indicate the steps. FIG. 28 shows the stiffness characteristics of the principal portions corresponding to the timings shown in FIG. 27. The division number for the micro steps is eight (n=3). The excitation states S0, S1, S2, and the like in FIG. 27 correspond to S0, S1, S2, and the like of the stiffness characteristics shown in FIG. 28. In FIG. 28, P1, P2, P3 and the like are "stable points" where the torque of the rotor 6 is in equilibrium with the load given by the moving body. Since the load torque given by the moving body is constant, unless the state (weight, friction and the like) of the moving body is not varied, the load torque is represented by a line parallel to the axis of abscissas in FIG. 28. The intersections between the line representing the load torque and the curve representing the stiffness characteristics are the stable points. By sequentially switching the excitation states in the order of S1→S2→S3→, and the like, the rotor 6 rotates at the positions P1→P2→P3→, and the like.

The switching operation between the two-phase excitation drive and the micro step drive will now be described in the sequential order of the excitation states S0 to S7. In the initial excitation state S0, the head is moving in the direction defined by the direction instruction DIR by the micro step drive. Since the division number is eight, the rotor 6 rotates a 0.125 step at each of the positions P0→P0.125→P0.250→P0.375→P0.500→...→P1, and the transition from the state S0 to the state S1 is performed.

Before the transition to the state S1, the switching instruction MS/2P is changed from "1" (indicating the micro step drive) into "0" (indicating the two-phase excitation drive). The moment the state where all the lower bits An−1 to A0 at the output of the up/down counter 10 become "0", i.e., when the state S1 begins, the D flip-flop 11a of the switching timing adjuster 213 latches the switching instruction MS/2P with the output of the AND gate 11b, thereby outputting the data selection signal DSEL to the control terminals of the multiplexers 215a and 215b. In the period after the state S0 begins and immediately before the state S1 begins (or the state S0.875), SEL is "1". Therefore, the multiplexers 215a and 215b select the contents of the ROMs 9a and 9b, thereby outputting the selected data to the current drivers 8a and 8b.

The movement correction value generator 211 outputs a movement correction value to the adder 212 based on the direction instruction DIR and the load LOAD. The adder 212 adds the addresses from the up/down counter 10 and the movement correction values, and outputs the results to the ROMs 9a and 9b. By adding the movement correction value (+2 in FIG. 27) to the address, the phase of the current pattern in the micro step drive can be shifted. In this example, the transition from the state represented by the characteristic curve S1.250 of the micro step drive to the state represented by the characteristic curve S1 of the two-phase excitation drive is performed. As a result, as shown in FIG. 28, the micro step drive can be switched into the two-phase excitation drive at the stable point P1, i.e., an intersection between the curve representing the stiffness characteristics of the micro step drive and the two-phase excitation drive and the line representing the load torque. In this way, the switching can be performed smoothly in the state where the load exists.

In the case where such a movement correction value is not added, i.e., in the case where the transition from the state represented by the curve S1 of the micro step drive to the state represented by the curve S1 of the two-phase excitation drive is performed, the head moves from the stable point P0.750 to the stable point P1 in switching the drive method. According to the method of the fifth example, it is possible to avoid such a discontinuous movement of the head in switching the drive method.

In the period after the state S1 begins and immediately before the state S4 begins, the two-phase excitation drive is selected. If the moving pulse CLK is continuously input to the up/down counter 10, then the upper bits An and An+1 of the up/down counter 10 are varied, so that the current instruction values of the two-phase excitation signal generators 214a and 214b are output. In FIG. 27, in the period during which the data selection signal DSEL is valid, or in the states from S1 to S4, the two-phase excitation drive is performed. The rotor 6 rotates at the stable points of the stiffness characteristics shown in FIG. 28 in the order of P1→P2→P3→P4. The torque generated in the two-phase excitation drive is larger than the torque generated in the micro step drive. Therefore, the moving body can be moved at a high speed by a large torque from the stable point P1 through the stable point P4.

At a point between the states S3 and S4, the switching instruction MS/2P is changed from "0" (indicating the two-phase excitation drive) into "1" (indicating the micro step drive). When all the lower bits An−1 to A0 at the output of the up/down counter 10 become "0", i.e., when the state S4 begins, the switching instruction MS/2P is latched with the output of the D flip-flop 11b, thereby outputting the data selection signal DSEL to the control terminals of the multiplexers 215a and 215b. Since the data selection signal DSEL is "1", the multiplexers 215a and 215b select the outputs from the ROMs 9a and 9b in the state S4 and outputs the selected outputs to the current drivers 8a and 8b.

As described above, the movement correction value generator 211 outputs a movement correction value to the adder 212 based on the direction instruction DIR and the load LOAD. By adding the movement correction value (+2 in FIG. 27) to the address output from the up/down counter 10, the phase of the current pattern in the micro step drive can be shifted. In this case, the transition from the state represented by the characteristic curve S4 of the two-phase excitation drive to the state represented by the characteristic curve S4.25 of the micro step drive is performed. As a result, as shown in FIG. 28, the two-phase excitation drive can be switched into the micro step drive at the stable point P4, i.e., an intersection between the curve representing the stiffness characteristics of the micro step drive and the two-phase excitation drive and the line representing the load torque.

Thereafter, the transition from the state S4 to the state S5 is performed every 0.125 step in the order of P4→P4.125→P4.250→. . . →P4.750→P5.

Figure 27:
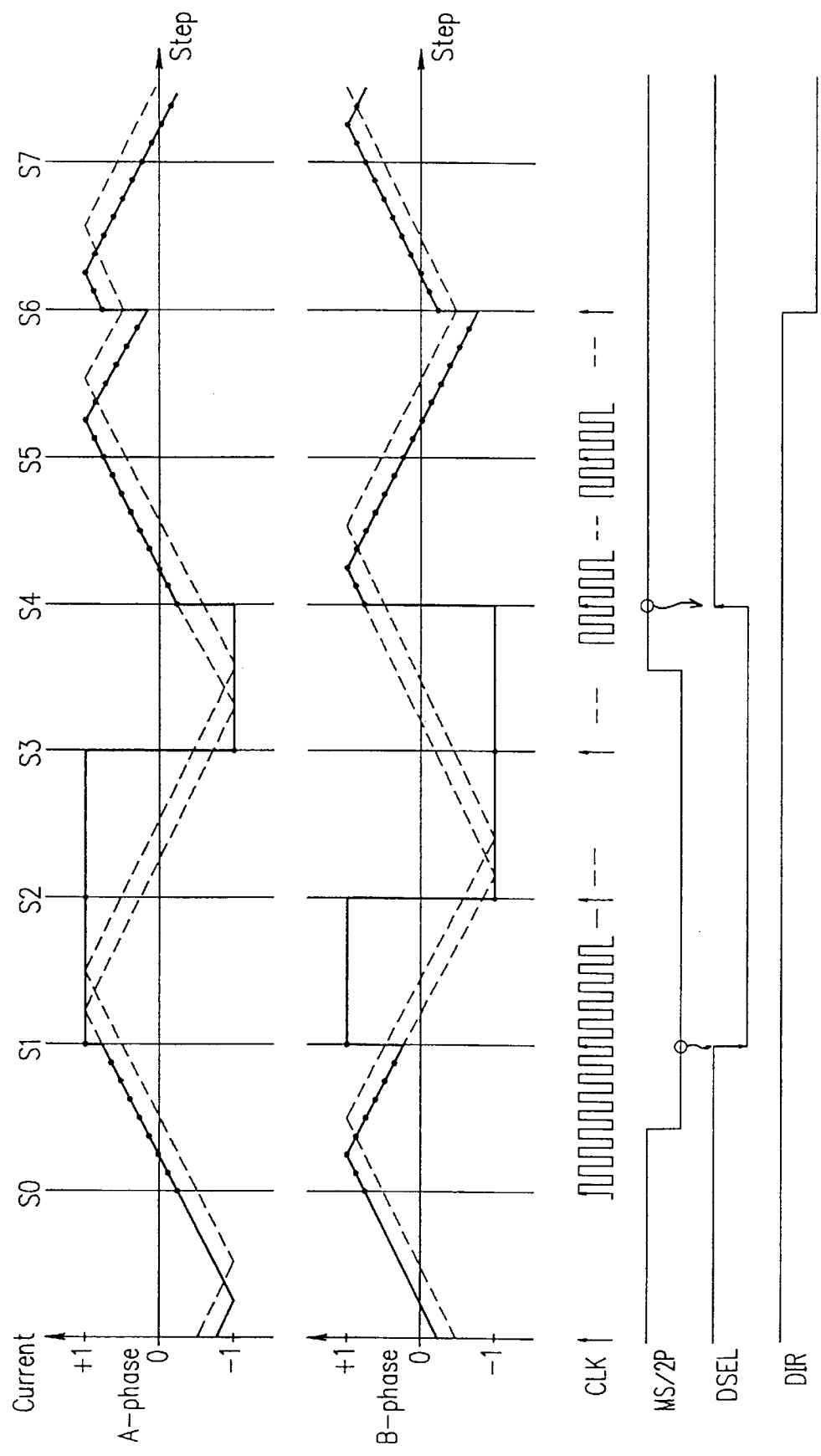
FIG. 27 shows the timings of the respective signals for the respective components.
Figure 28:
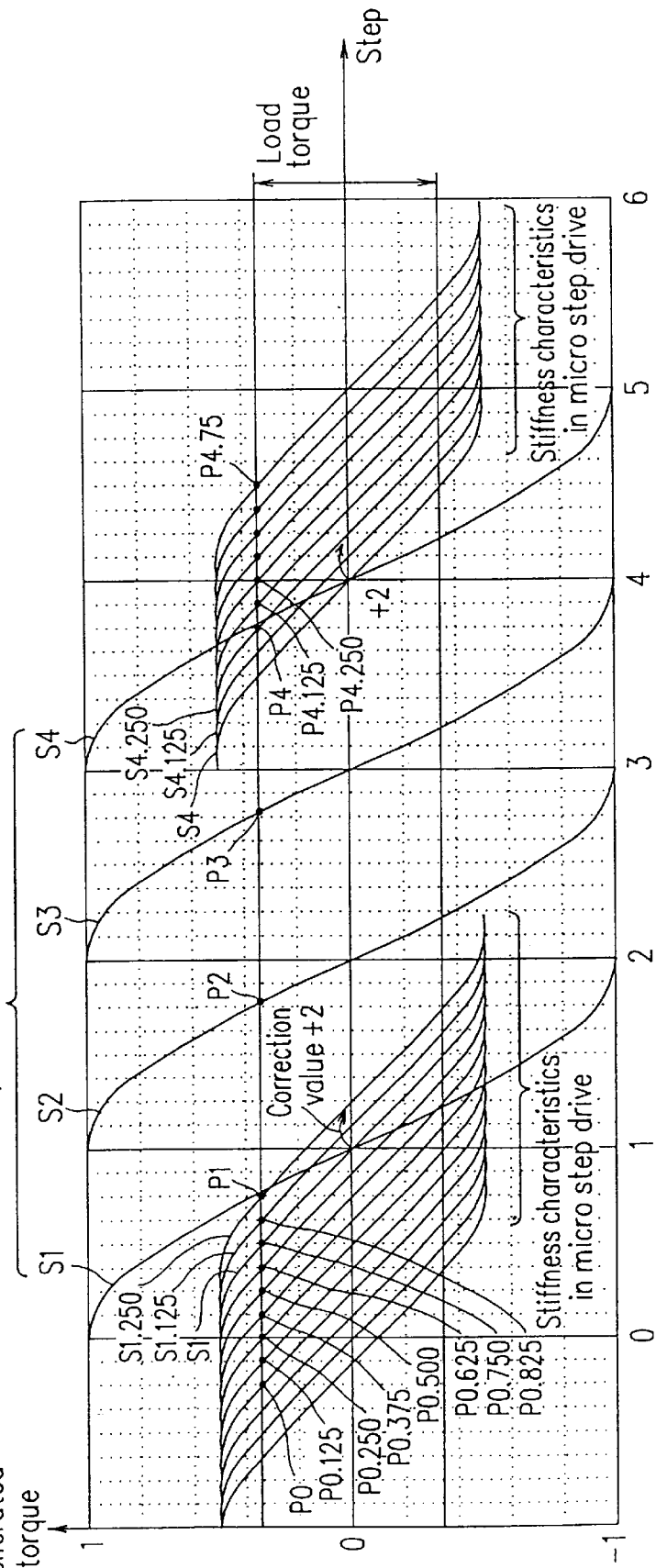
FIG. 28 is a graph showing the stiffness characteristics of the principal portions corresponding to the timings shown in FIG. 27.

In FIG. 27, when the direction instruction DIR is inverted in the state S6, the up/down of the up/down counter 10 is inverted, and at the same time, the movement correction value is changed, e.g., from +2 into −2. After the state S6 begins, the moving body is moved in the reverse direction. The switching operation between the micro step drive and the two-phase excitation drive after the direction instruction DIR is inverted is performed in the same way as the operation before the inversion, except that the direction is reversed and that the code of the movement correction value is also inverted.

In the stepping motor driving apparatus according to the fifth example of the present invention, when the current instruction table for the micro step drive is read out from the ROMs 9a and 9b, the read address is shifted based on the movement correction value. In other words, by shifting the phase of the current pattern, it is possible to suppress the difference in the amount of the torque generated in switching the drive method between the two-phase excitation drive and the micro step drive when a load exists. As a result, the vibration caused by the switching of the drive method can be reduced. By alternately using the two-phase excitation drive and the micro step drive, the moving body can be moved at high speeds, and the moving body can be precisely moved at fine steps without applying a large disturbance thereto.

Figure 29A:
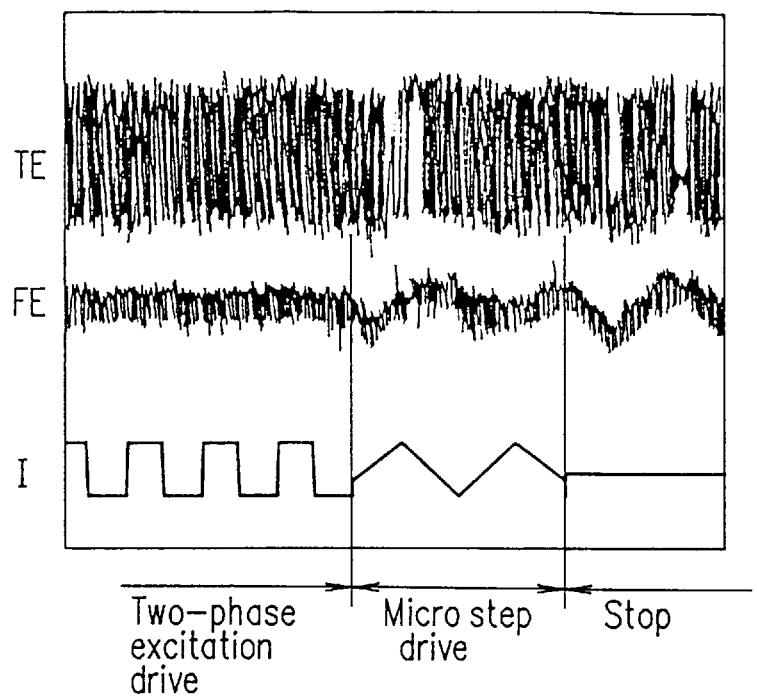
FIGS. 29A and 29B show a tracking error signal TE, a focusing error signal FE and a current instruction value I of the stepping motor in a conventional example and in the fifth example of the present invention, respectively.
Figure 29B:
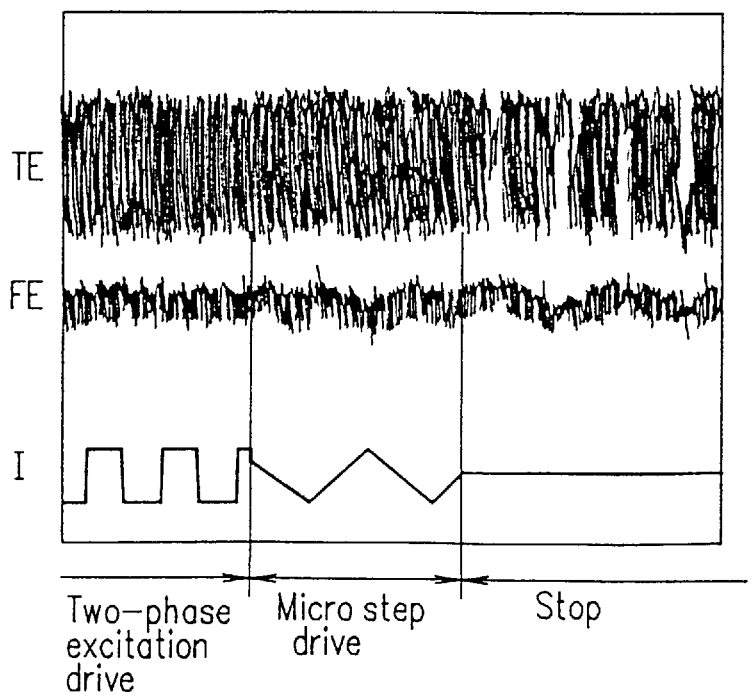

FIGS. 29A and 29B show a tracking error signal TE, a focusing error signal FE and a current instruction value I of the stepping motor in a conventional example and the fifth example of the present invention, respectively. In both cases, the drive method is switched from the two-phase excitation drive into the micro step drive, and then the stepping motor is stopped. In FIGS. 29A and 29B, the abscissas indicate time and the ordinates indicate voltages of the respective signals. In the conventional example shown in FIG. 29A, after the drive method is switched from the two-phase excitation drive into the micro step drive, a vibration is generated in an objective lens, so that the frequency of the tracking error signal TE is varied and a waviness (i.e., variation in an envelope) is generated in the focusing error signal FE. On the other hand, in the fifth example shown in FIG. 29B, the vibration of the head can be suppressed, so that the variation of the focusing error signal FE can be reduced, in particular.

Figure 30:
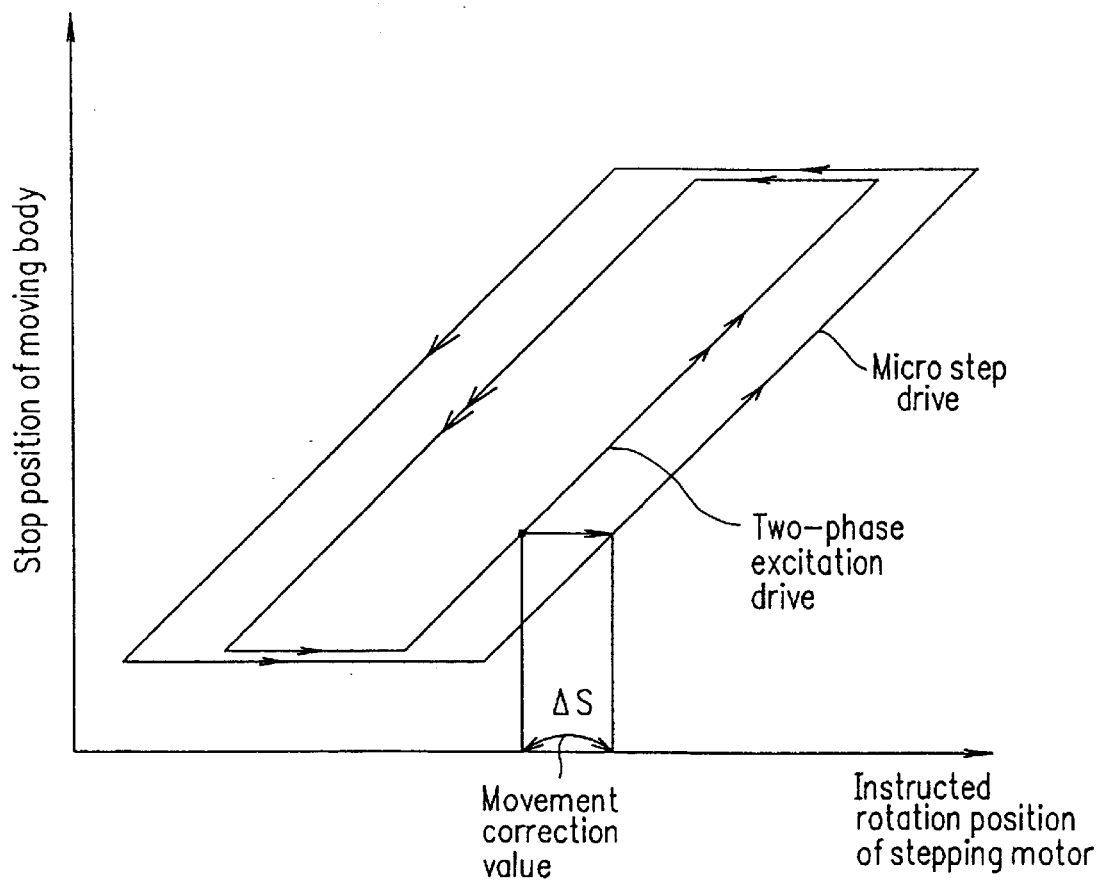
FIG. 30 shows the relationship between the position of the moving body and the rotation instruction position of the stepping motor.

The procedure for calculating the movement correction value used in the fifth example will now be described below. FIG. 30 shows the relationship between the stop position of the moving body (not shown) and the rotation instruction position of the stepping motor in the cases of performing the two-phase excitation drive and the micro step, respectively. As shown in FIG. 30, a hysteresis curve is generally calculated. The difference of the hysteresis amount between the two drive methods is caused by the difference in the inclination of the curves showing the stiffness characteristics between the two drive methods. A value corresponding to Δs can be used as the movement correction value. In general, when the moving body is a head for an optical disk or a head for a printer, the load can be regarded as substantially constant. Therefore, the value Δs calculated experimentally can be used as a constant value.

Instead of calculating the hysteresis curve, an appropriate correction value can be obtained by actually varying the movement correction value. That is to say, it is possible to use a movement correction value to be obtained by gradually increasing the movement correction value from zero until the difference between the hysteresis of the two-phase excitation drive and that of the micro step becomes a predetermined error or less.

EXAMPLE 6

Figure 31:
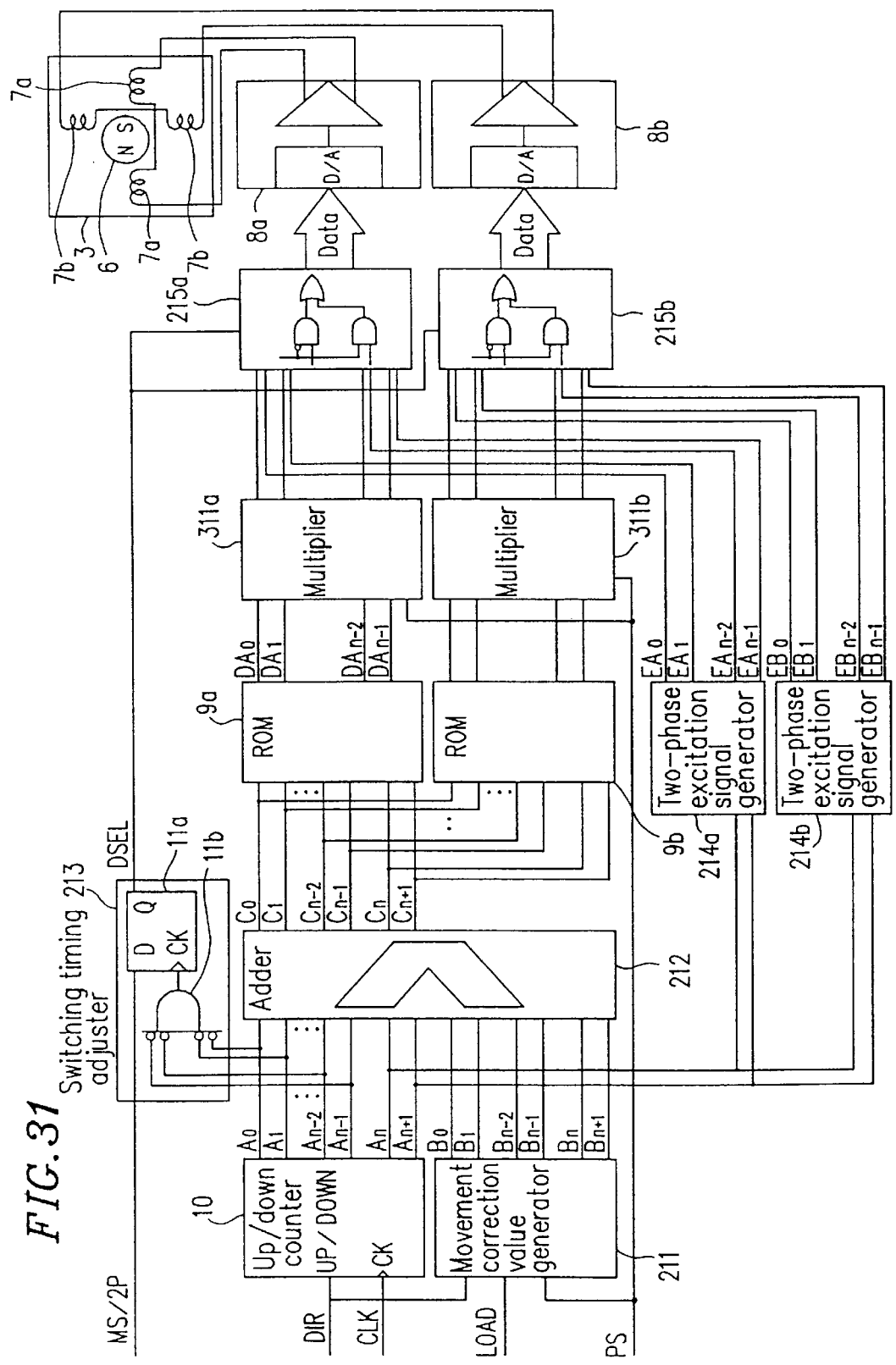
FIG. 31 is a block diagram showing a configuration of a stepping motor driving apparatus according to a sixth example of the present invention.

FIG. 31 is a block diagram showing a configuration of a stepping motor driving apparatus according to a sixth example of the present invention. The stepping motor driving apparatus of the sixth example has the same configuration as that of the stepping motor driving apparatus of the fifth example, except that the outputs from the ROMs 9a and 9b are supplied to the multiplexers 215a and 215b via the multipliers 311a and 311b. In the sixth example, the multipliers 311a and 311b can vary the current instruction values for the micro step drive stored in the ROMs 9a and 9b. The current instruction values can be varied by a current limit signal PS when the moving body is stopped. The current limit signal PS is also supplied to the movement correction value generator 211, thereby changing the movement correction value.

Figure 32A:
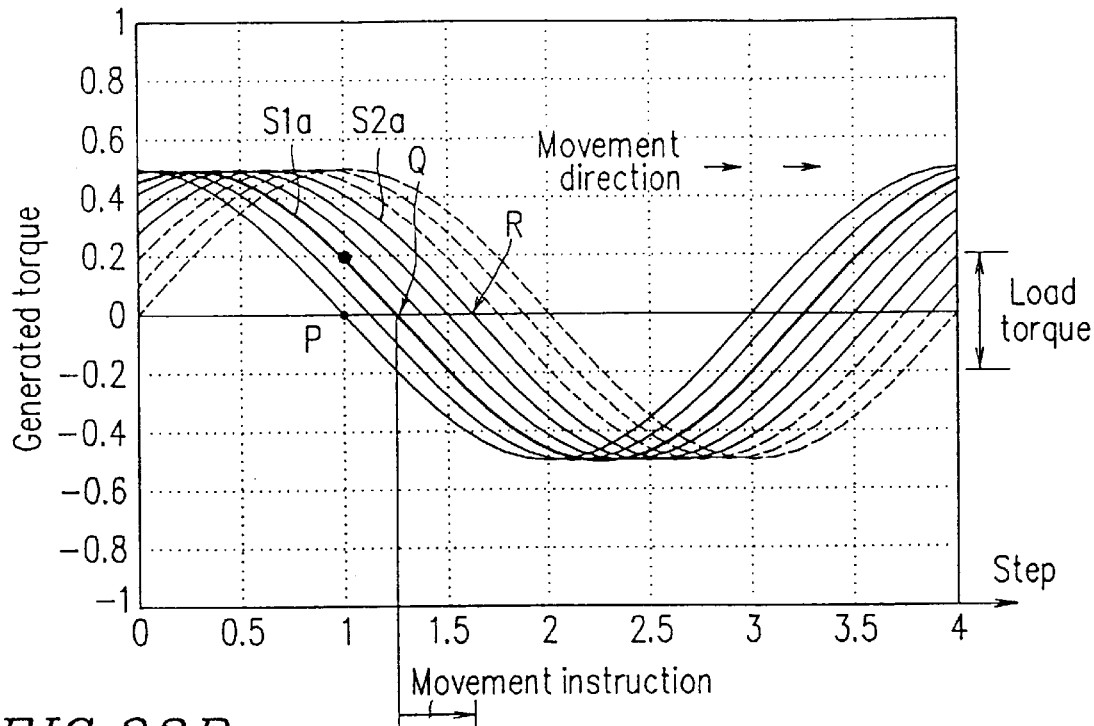
Figure 32B:
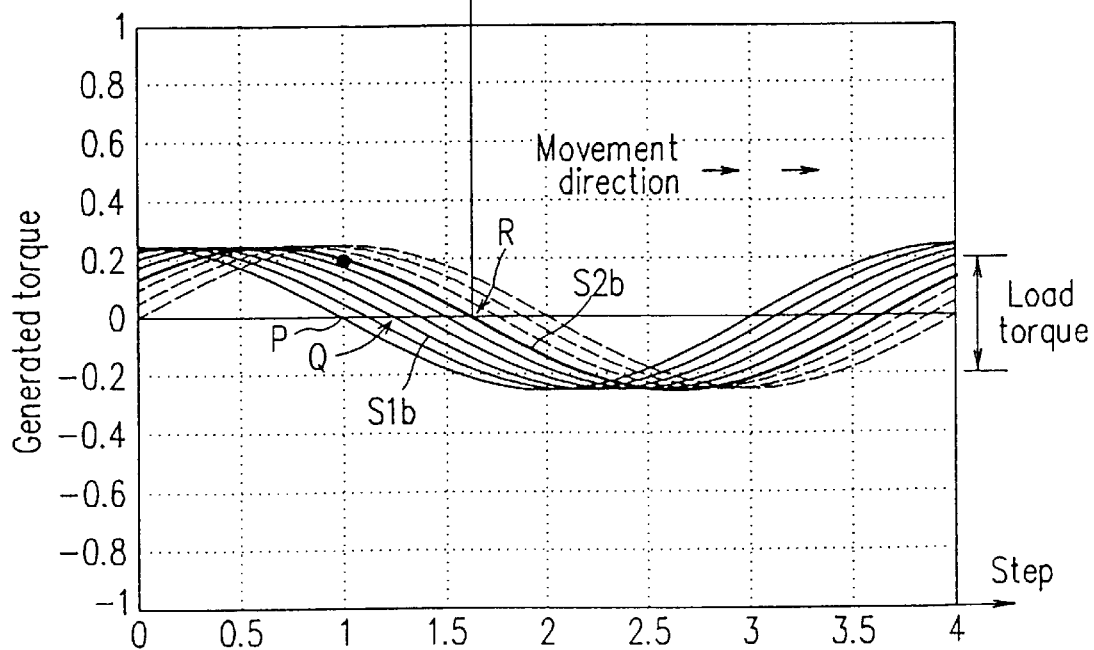
FIG. 32B is a graph showing the stiffness characteristics when the current is limited to one half of the current shown in FIG. 32A.

FIG. 32A shows the stiffness characteristics when the current is not limited, while FIG. 32B shows the stiffness characteristics when the current is limited to one half of the current shown in FIG. 32A. As shown in FIG. 32A, the moving body stops at the point P where the stiffness characteristics S1a (indicated by the bold solid line in FIG. 32A) is in equilibrium with the load torque. In this state, if the current is limited to one half, the generated torque is reduced to one half, so that the stop position P deviates. Therefore, by limiting the current instruction value to one half and simultaneously shifting the drive phase of the stepping motor from Q to R (correction value=+3), the stiffness characteristics are switched from S1a into S2b (indicated by the bold solid line in FIG. 32B). By simultaneously using the multipliers 311a and 311b and a unit of the movement correction value generator 211, the drive current can be reduced and the deviation of the position at the stop point can be prevented.

The above-described method in which the current instruction value is reduced and the phase of the pattern of the current instruction value is shifted at the same time is advantageously applicable to the case of employing a single drive method. In other words, though the head is driven by switching the drive method between the two-phase excitation drive and the micro step drive in the sixth example, it is not always necessary to use the two kinds of drive methods. The method of this example is applicable to the case of employing the micro step drive only, for example.

EXAMPLE 7

Figure 33:
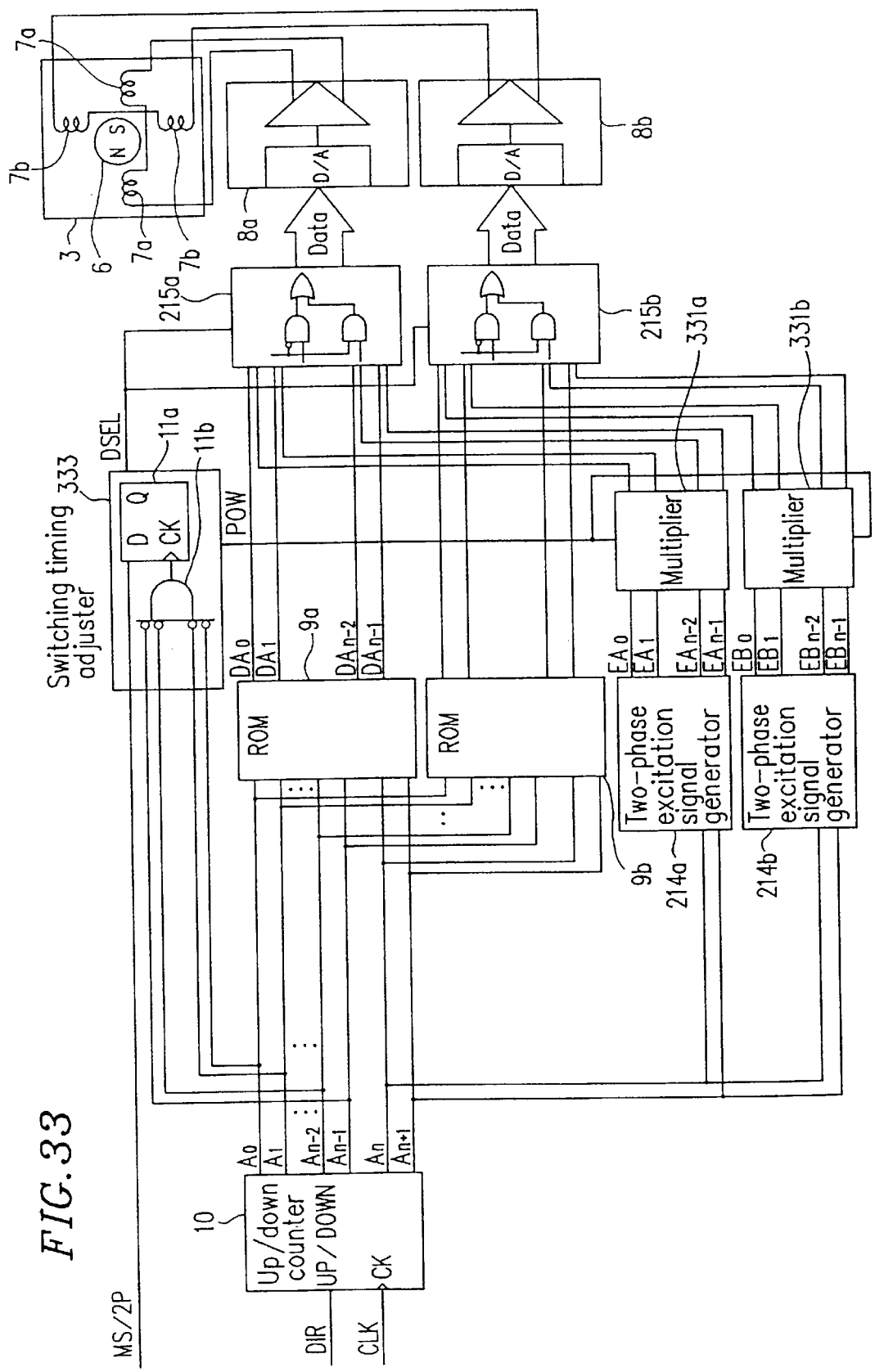
FIG. 33 is a block diagram showing a configuration of a stepping motor driving apparatus according to a seventh example of the present invention.

FIG. 33 is a block diagram showing a configuration of a stepping motor driving apparatus according to a seventh example of the present invention. The stepping motor driving apparatus of the seventh example has the same configuration as that of the stepping motor driving apparatus of the fifth example, except that the outputs from the two-phase excitation signal generators 214a and 214b are supplied to the multiplexers 215a and 215b via the multipliers 331a and 331b; that the movement correction value generator 211 of the fifth example is not provided; and that the switching timing adjuster 333 supplies a power instruction POW to the multipliers 331a and 331b.

The multipliers 331a and 331b vary the current instruction values for the two-phase excitation drive based on the power instruction POW. More specifically, the multipliers 331a and 331b multiply the current instruction values output from the two-phase excitation signal generators 214a and 214b by an appropriate coefficient, thereby smoothly switching the drive method between the two-phase excitation drive and the micro step drive.

Figure 34:
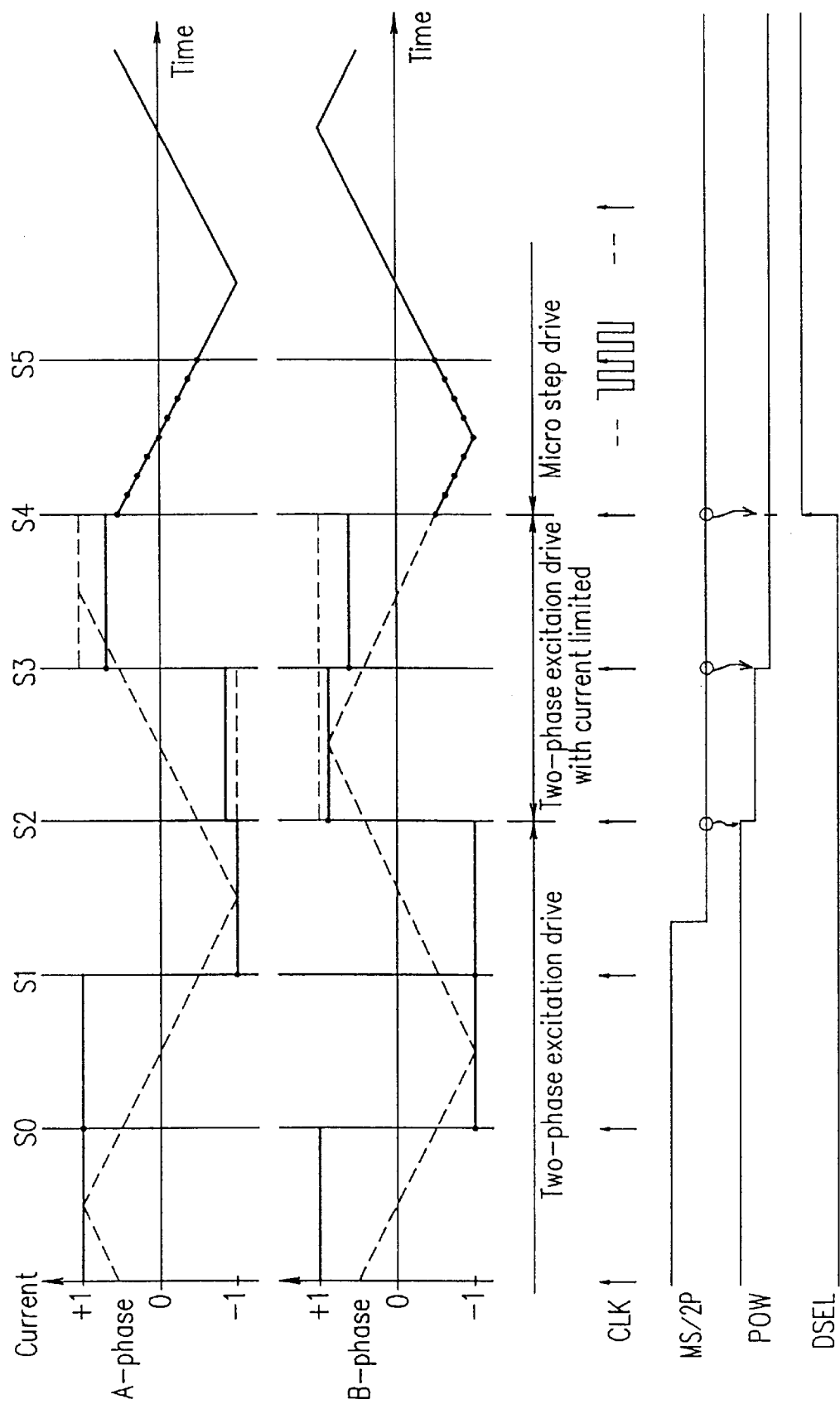
FIG. 34 shows the switching timings of the respective signals for the respective components.
Figure 35:
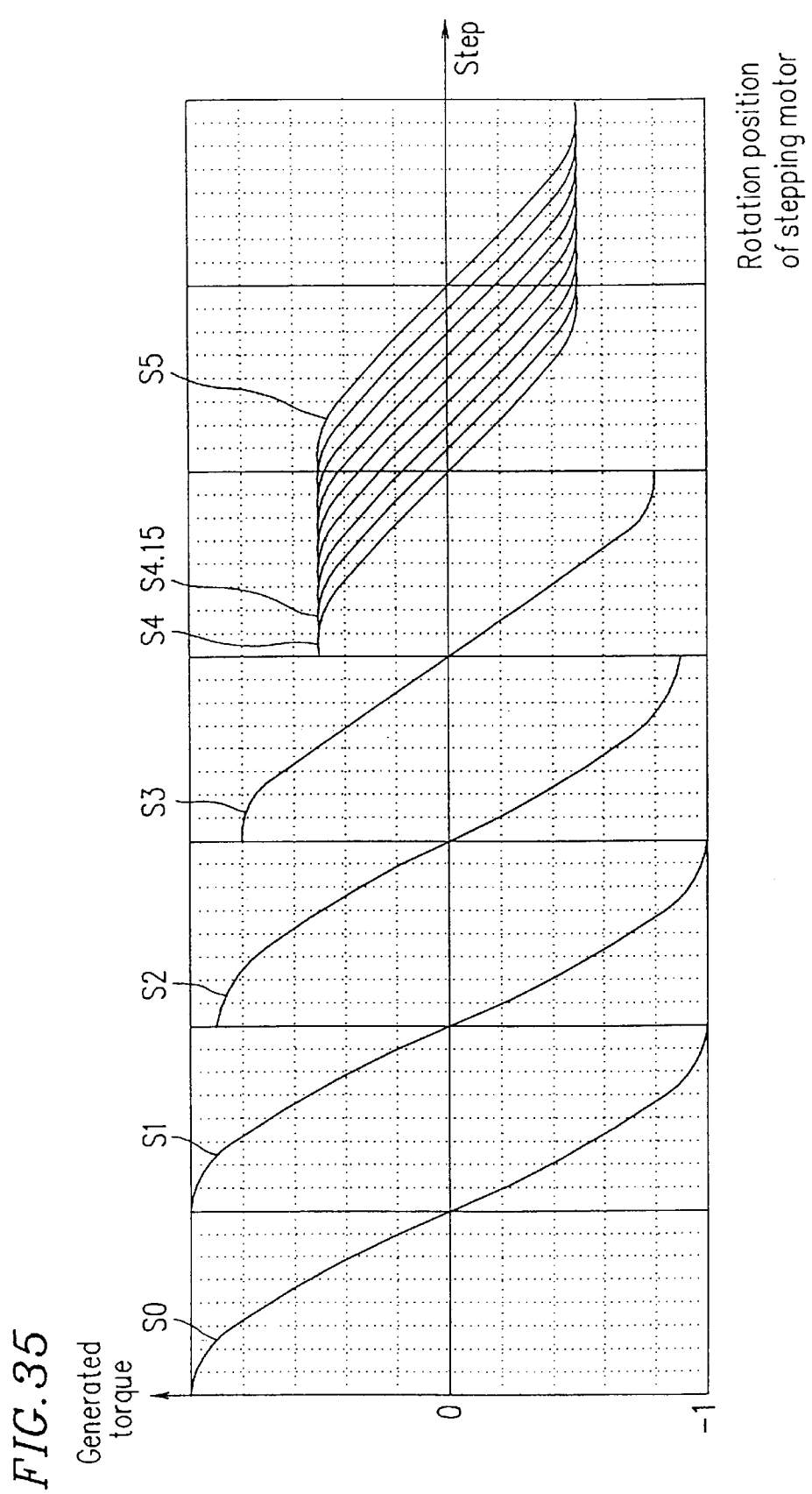
FIG. 35 is a graph showing the stiffness characteristics of the principal portions corresponding to the switching timings shown in FIG. 34.

FIG. 34 shows the timings for switching the signals for the respective components. FIG. 35 shows the stiffness characteristics of the principal portions corresponding to the switching timings shown in FIG. 34. The division number for the micro steps is eight (n=3). The excitation states S0 to S5 in FIG. 34 correspond to S0 to S5 of the stiffness characteristics shown in FIG. 35. In the period after the state S0 begins and immediately before the state S2 begins, the two-phase excitation drive is performed by the two-phase excitation signal generators 214a and 214b. When the switching instruction MS/2P is changed at a point between the states S1 and S2, the drive method is switched from the two-phase excitation drive into the micro step drive. Using the multipliers 331a and 331b, the current instruction values in the phases A and B are sequentially reduced immediately before the state S4 begins. After the state S4 begins, the micro step drive is performed based on the data stored in the ROMs 9a and 9b. As shown in FIG. 35, the stiffness characteristics of the two-phase excitation drive in the states S2 and S3 gradually become close to the stiffness characteristics of the micro step drive in the state S4. If the stiffness characteristics of the two-phase excitation drive gradually become close to the stiffness characteristics of the micro step drive in this way, then it is possible to prevent an abrupt change of torque. The transition from the micro step drive to the two-phase excitation drive is performed in an opposite manner, i.e., by gradually increasing the current instruction values of the two-phase excitation drive.

According to the method of the seventh example, the drive method is switched into the micro step drive while reducing the current instruction values of the two-phase excitation drive by using the multipliers 331a and 331b. As a result, it is possible to suppress the variation of generated torque caused in switching the drive method between the two-phase excitation drive and the micro step drive, and reduce the vibration caused by the switching. It is noted that the same effects as those of the fourth example can be attained in this seventh example. More specifically, in the case where the stepping motor is rotated at a predetermined speed or lower, excessive torque generated when the motor is rotating at a low speed can be reduced by reducing the current by the multiplier, so that the vibration generated can be reduced.

Figure 36:
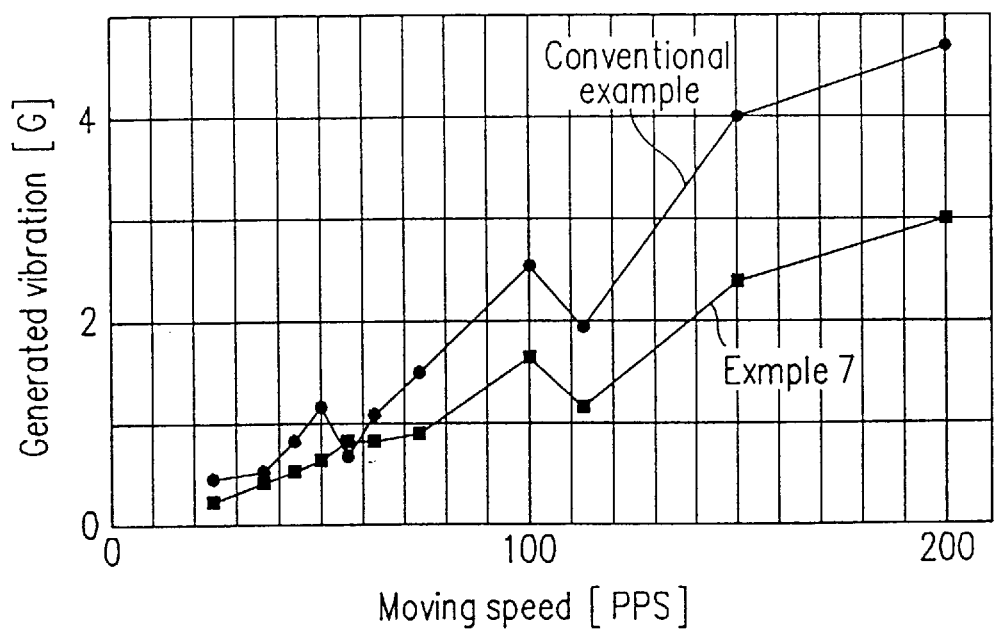
FIG. 36 is a graph showing the relationship between the moving speed of the head driving apparatus of the seventh example and the vibration generated.
Figure 37:
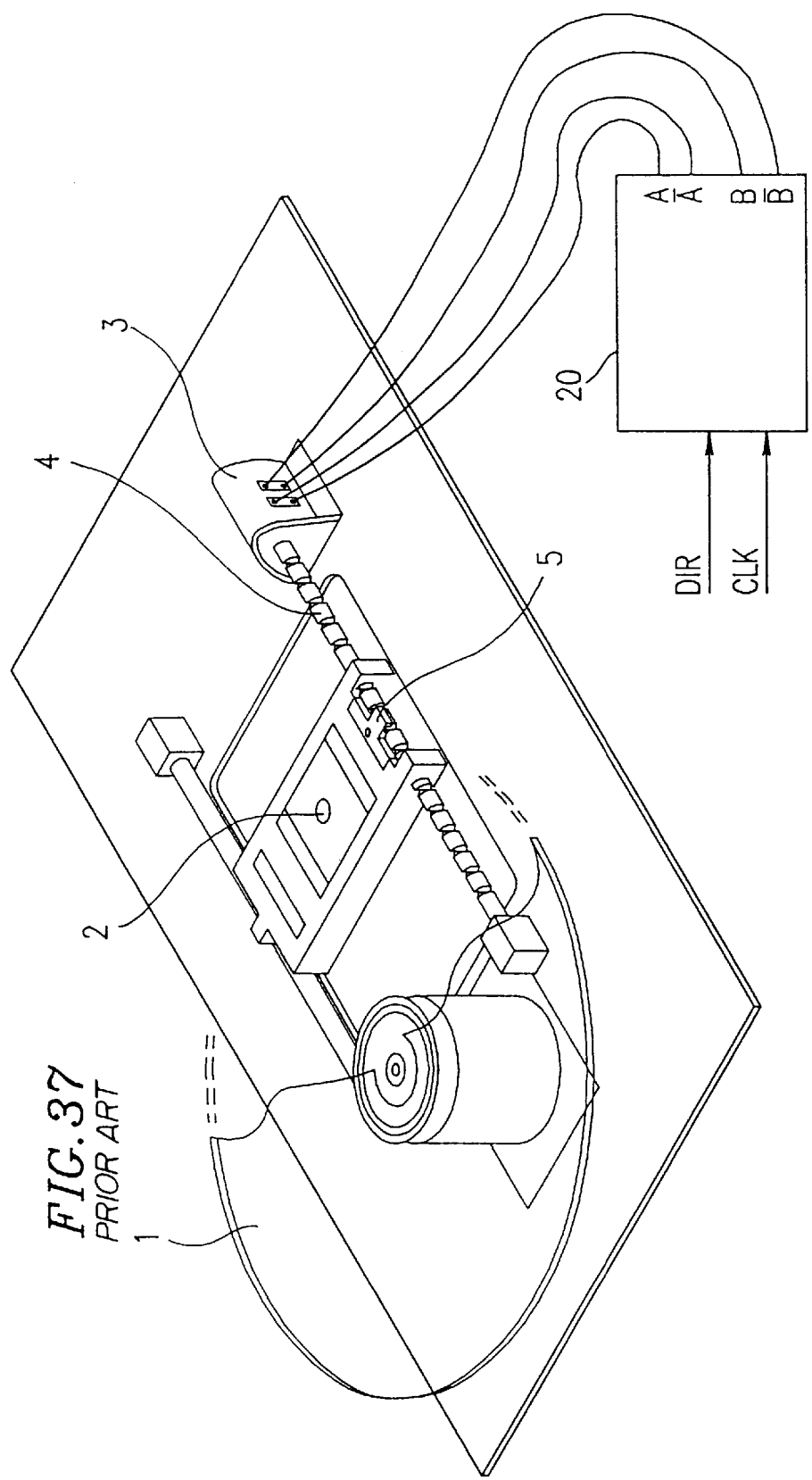
FIG. 37 is a perspective view schematically showing a configuration of a conventional head driving apparatus.
Figure 38A:
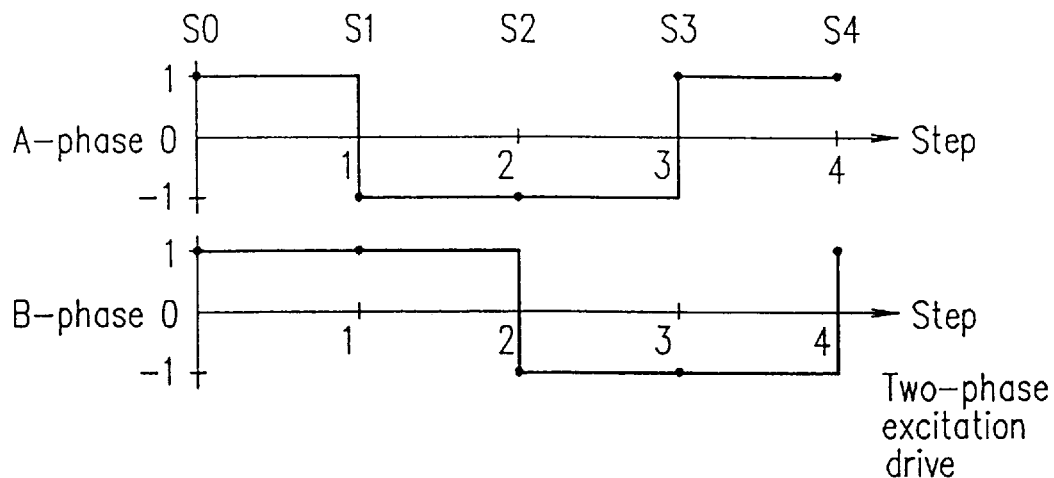
Figure 38B:
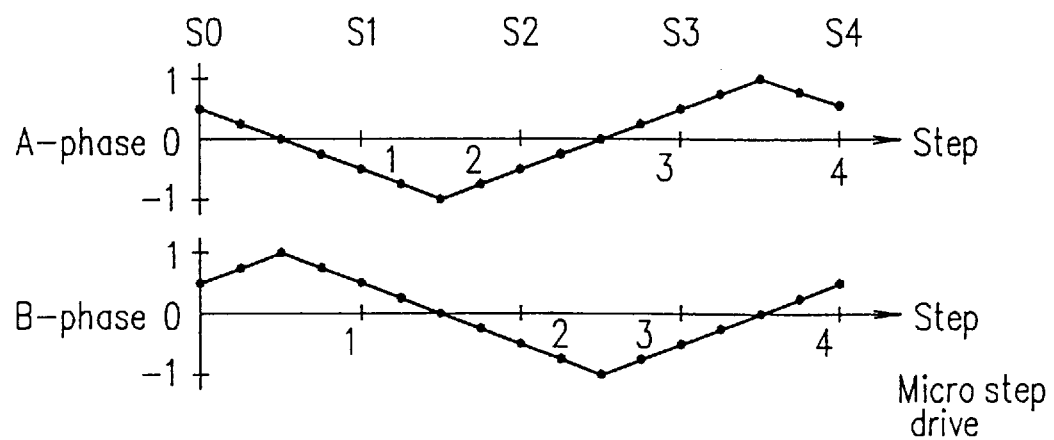
FIG. 38B shows excitation sequences in the A-phase and the B-phase when the stepping motor driving apparatus drives the stepping motor by the micro step drive.
Figure 39A:
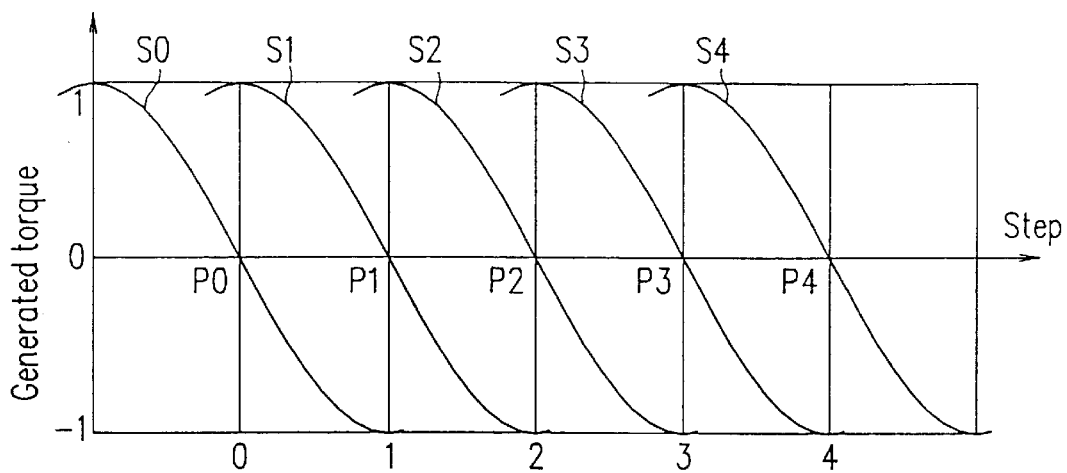
FIGS. 39A and 39B are graphs showing the stiffness characteristics of the stepping motor when the excitation sequences shown in FIGS. 38A and 38B are performed.
Figure 39B:
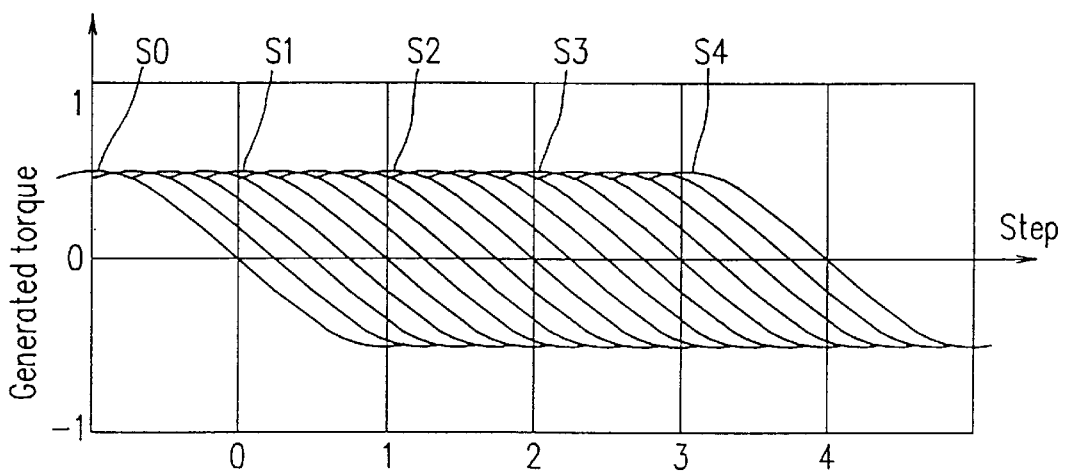

FIG. 36 is a graph showing the relationship between the moving speed of the head driving apparatus of the seventh example and the vibration to be generated. In FIG. 36, the abscissas indicate the moving speed (in pulse/second) of the moving body, while the ordinates indicate the vibration to be generated (in G where 1 G=9.8 m/s$^2$) in the moving direction. As is apparent from the comparison between a conventional example and the seventh example, the generation of the vibration can be reduced by about 30 to 40% in the entire region of the moving speed.

According to the present invention, the drive method is switched between the two-phase excitation drive and the micro step drive at a point where the current instruction value of the current pattern to be used for the two-phase excitation drive becomes equal to the current instruction value of the current pattern to be used for the micro step drive. As a result, the moving body can be moved at a high speed by performing the two-phase excitation drive; the moving body can be moved with high resolution by performing the micro step drive without applying a large disturbance; and the drive method can be smoothly switched at a high speed between the two-phase excitation drive and the micro step drive.

In addition, according to the present invention, a maximum amount of current is supplied to at least one of the coils while maintaining the ratio of the current in the respective phases by using a conventional current table. As a result, in the case of performing the micro step drive, the error in positioning the head can be reduced by partially increasing the torque without changing the intervals among the stable points of the respective steps.

Moreover, according to the present invention, excessive torque generated when the stepping motor is driven at a predetermined speed or lower in the micro step drive or the two-phase excitation drive can be reduced. As a result, generation of the vibration can be suppressed.

Furthermore, according to the present invention, by shifting the phase of the current pattern used for the micro step drive, the drive method is switched between the micro step drive and the two-phase excitation drive at a point where the amount of the generated torque is equal in both the drive method. As a result, the generation of the vibration can be suppressed in a stepping motor having a load.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A stepping motor driving apparatus having a rotor and a stator in n phases for moving a moving body, where n is an integer equal to or larger than 2, comprising:

a first memory means for storing a first current pattern for rotating the rotor at a first pitch;

a second memory means for storing a second current pattern for rotating the rotor at a second pitch different from the first pitch;

phase shift means for reproducing periodically the first current pattern and the second current pattern from the first memory means and the second memory means, and shifting a phase of the second current pattern by a predetermined phase shift amount from the first current pattern; and drive means for selectively supplying to the stator the first current pattern and the second current pattern based on a drive switching signal;

wherein the first current pattern and the second current pattern supplied to the stator are switched between one another at a stable point by setting the phase shift amount in accordance with the load of the stepping motor required to move the moving body and the rotating direction of the rotor, wherein the stable point is represented by an intersection between a characteristic line of the load in a graph showing the stiffness characteristics of the stepping motor and the curves representing stiffness characteristics driven by the first and second current patterns.

2. A stepping motor driving apparatus according to claim 1, wherein the phase shift means further comprises:

an up/down counter for designating an address for reading the first current pattern from the first memory means;

phase shift calculation means for calculating and outputting the phase shift amount based on the load of the stepping motor and the rotating direction of the rotor, wherein the second current pattern is reproduced from the second memory means by using an address generated by adding the phase shift amount to the up/down counter.

3. A stepping motor driving apparatus according to claim 2, wherein the drive means comprises an up/down counter for designating the address for reading the first current data and the second current data from the memory means, and wherein the up/down counter is an up/down counter having a width of i bits, where i is an integer equal to or larger than 3, and switches the first current pattern and the second current pattern when all lower (i−2) bits become "0".

4. A stepping motor driving apparatus according to claim 2, wherein the phase shift amount does not exceed a predetermined range.

5. A stepping motor driving apparatus according to claim 2, wherein the phase shift calculation means calculates the phase shift amount based on a difference between a hysteresis characteristic generated when the moving body is driven by the first current pattern and a hysteresis characteristic generated when the moving body is driven by the second current pattern.

6. A stepping motor driving apparatus according to claim 1, wherein the drive means comprises current-variable means for multiplying the second current pattern by a prescribed constant to obtain a third current pattern and supplying the third current pattern to the stator, wherein the second current pattern is switched to the third current pattern at the stable point by setting the phase shift amount in accordance with the load of the stepping motor required to move the moving body and the rotating direction of the rotor, wherein the stable point is represented by an intersection between the characteristic line of the load in a graph showing the stiffness characteristics of the stepping motor and curves representing the stiffness characteristics driven by the second and third current patterns.

7. A stepping motor driving apparatus according to claim 6, wherein, in moving the moving body at a predetermined speed or lower, the current-variable means supplies to the stator the third current pattern which is obtained by multiplying the second current pattern by a prescribed constant smaller than 1.

* * * * *